(12) United States Patent
Wang et al.

(10) Patent No.: US 12,134,872 B2
(45) Date of Patent: Nov. 5, 2024

(54) HIGH-EFFICIENT SWIFT STEPLESS LAYERING WATER TAKING GATE DEVICE

(71) Applicant: CHINA POWER CONSTRUCTION GROUP GUIYANG SURVEY, DESIGN AND RESEARCH INSTITUTE CO., LTD, Guizhou (CN)

(72) Inventors: Xingen Wang, Guizhou (CN); Zhenggang Zhan, Guizhou (CN); Zaixing Zhao, Guizhou (CN); Hezuo Zhang, Guizhou (CN); Xianzhu Shen, Guizhou (CN); Hongyou Mu, Guizhou (CN); Fan Chen, Guizhou (CN); Taoping Yang, Guizhou (CN); Yi Xu, Guizhou (CN); Haijun Lao, Guizhou (CN); Wei Gao, Guizhou (CN); Xin Wang, Guizhou (CN); Daren Deng, Guizhou (CN)

(73) Assignee: CHINA POWER CONSTRUCTION GROUP GUIYANG SURVEY, DESIGN AND RESEARCH INSTITUTE CO., LTD, Guiyan (CN)

(*) Notice: Subject to any disclaimer, the term of this patent is extended or adjusted under 35 U.S.C. 154(b) by 0 days.

(21) Appl. No.: 18/560,629

(22) PCT Filed: Apr. 21, 2022

(86) PCT No.: PCT/CN2022/088079
§ 371 (c)(1),
(2) Date: Nov. 13, 2023

(87) PCT Pub. No.: WO2023/134049
PCT Pub. Date: Jul. 20, 2023

(65) Prior Publication Data
US 2024/0247454 A1    Jul. 25, 2024

(30) Foreign Application Priority Data

Jan. 14, 2022    (CN) .................... 202210043984.6

(51) Int. Cl.
*E02B 7/44* (2006.01)
*E02B 7/36* (2006.01)

(52) U.S. Cl.
CPC ............... *E02B 7/44* (2013.01); *E02B 7/36* (2013.01)

(58) Field of Classification Search
CPC .................................................. E02B 7/20–54
See application file for complete search history.

(56) References Cited

U.S. PATENT DOCUMENTS

| | | | | |
|---|---|---|---|---|
| 2,125,928 A | * | 8/1938 | Knerr | E02B 7/26 405/106 |
| 8,876,431 B1 | * | 11/2014 | Becker | E02B 7/54 405/111 |

(Continued)

FOREIGN PATENT DOCUMENTS

| CN | 103352448 A | 10/2013 |
|---|---|---|
| CN | 107326875 A | 11/2017 |

(Continued)

OTHER PUBLICATIONS

International Search Report of PCT/CN2022/088079.
Written Opinion of PCT/CN2022/088079.

*Primary Examiner* — Janine M Kreck

(57) ABSTRACT

The disclosure provides a high-efficient swift stepless layering water intaking gate device, is including setting up the water intaking gate slot of the relative setting of the inlet port both sides on the dam body, its characterized in that: a plurality of sections of door leaves are arranged in the water taking gate groove from bottom to top; all the door leaves in the water intaking gate groove are divided into a group, and the adjacent door leaves are connected by adopting an (Continued)

internode connecting plate to form an integral water intaking gate; or all the gate leaves in the water intake gate groove are divided into a plurality of groups to form a plurality of sets of stop log type water intake gates, each set of stop log type water intake gate is provided with a plurality of sections of gate leaves.

14 Claims, 39 Drawing Sheets

(56) References Cited

U.S. PATENT DOCUMENTS

| | | | | |
|---|---|---|---|---|
| 9,689,130 | B1 * | 6/2017 | Becker | E02B 7/22 |
| 2012/0275863 | A1 * | 11/2012 | Goldwasser | E02B 7/28 |
| | | | | 405/103 |
| 2017/0321475 | A1 * | 11/2017 | Quek | E04H 9/145 |

FOREIGN PATENT DOCUMENTS

| | | |
|---|---|---|
| CN | 110725286 A | 1/2020 |
| CN | 212000924 U | 11/2020 |
| CN | 212405049 U | 1/2021 |
| CN | 212742439 U | 3/2021 |
| CN | 114215020 A | 3/2022 |
| FR | 2636103 A1 | 3/1990 |
| JP | 2004285804 A | 10/2004 |

* cited by examiner

Downstream view

E-E

HIGH-EFFICIENT SWIFT STEPLESS LAYERING WATER TAKING GATE DEVICE

CROSS-REFERENCE TO RELATED APPLICATIONS

This Application is a national stage application of PCT/CN2022/088079. This application claims priorities from PCT Application No. PCT/CN2022/088079, filed Apr. 21, 2022, and from the Chinese patent application 202210043984.6 filed Jan. 14, 2022, the content of which are incorporated herein in the entirety by reference.

TECHNICAL FIELD

The disclosure relates to the technical field of metal structures of hydraulic and hydroelectric engineering, in particular to a high-efficiency and quick stepless layered water-taking gate device.

BACKGROUND

With the rapid development of economy and the continuous improvement of life of people in China, the country pays more and more attention to the ecological water safety problem which relates to physical and mental health and environmental protection of people, and the water source site of the ecological water is mainly a reservoir, so the reservoir is one of key focus objects for solving the ecological water safety problem. For a reservoir, the water body of the reservoir has temperature and density gradient in the vertical direction, the water temperature, dissolved oxygen, plankton, turbidity, carbon dioxide and the like of the water quality of the water body of different depths are different, water is taken from different depths, the influence on ecology, agriculture, aquaculture, human life and downstream environment is different, and therefore the reservoir is generally required to be provided with layered water taking facilities.

For water conservancy projects, the main uses of reservoirs are irrigation water and urban domestic water, the influence on physical and psychological health is large, the requirement on water quality is generally higher, surface water of the reservoirs is often polluted by floating objects or garbage and cannot meet the requirement, and water bodies with certain depth and range need to be taken down to meet the requirement on water quality, so that the water quality safety of the reservoirs can control pollution sources, and the important point is that the reservoirs can use water bodies meeting the requirements on ecological water quality, so that the reservoirs can take water in any depth and range.

For hydroelectric engineering, the water depth of the downstream river is not large, and because of the rapid water flow and the large vertical component of the circulation velocity, the water bodies in the upper and lower layers are continuously mixed, and the heat exchange capacity between the water surface and the air can be rapidly transferred to other parts, so the water temperature distribution on the whole water flow section is basically uniform, and the water temperature of the downstream river in the reservoir is influenced by the meteorological conditions, the position of a water discharge hole (hole) of the reservoir, the operation scheduling of the reservoir, the heat exchange between the water body and a river bed, the natural incoming water heat exchange of each branch in the interval and the like, wherein the influence of the discharge temperature of the reservoir is large, the discharge water temperature is high, and the water temperature of the river is high, otherwise, the water temperature is low. According to the knowledge, the reservoir of the hydroelectric engineering is mainly used for lowering a water body meeting the downstream natural ecological balance while generating electricity, and is mainly used for lowering a water body with higher temperature, so that the surface water of the reservoir is generally taken by the hydroelectric engineering to improve the temperature of the discharged water; however, for the hydropower engineering in the cold area, because the surface water body temperature is lower in winter, the water body meeting the water temperature requirement at the middle lower part needs to be introduced in winter, and therefore, for the hydropower engineering in the cold area, the reservoir also needs to be capable of randomly taking the water body within a larger depth range.

For water taking from reservoirs, a layered water taking technology such as a stoplog gate or a multilayer water taking runner is arranged at a water inlet or a water taking port, wherein the application of the stoplog gate is more, and the layered water taking technology is particularly prominent in hydropower engineering of a high dam and large reservoir, such as built hydropower stations (see table 1) of Jinsha river white crane beach, Jinsha river Xiluo du, lan cang river glutinous du, lan cang river Huangdeng, Yalong river jinping First-level, Beipan river Guangzhao, Yanjiang river beach pit and the like. According to table 1, the number of orifices of large-scale civil and hydroelectric engineering is large, the water level amplitude is large, the unit flow rate is large, and therefore the top control water depth of the stoplog gate is large and generally reaches more than 15 m, so that the times of operating the stoplog gate on one floor are large, the lifting height is large, taking the Jinsha Jiangxi Luo hydropower station as an example, if the same stoplog gate is lifted out of the orifices, 90 sections of stoplog gate leaves need to be lifted, the operation times reach 90 times, and the operation is tedious and consumes too long time.

TABLE 1 technical characteristics of layered water-taking of stop log gate of representative built large hydropower station in China.

| Serial number | Project | Water-taking rate (m³/s) | Amplitude of water level (m) | Number of stoplog gate | Single stoplog gate height (m) | stoplog gate top control water depth (m) |
|---|---|---|---|---|---|---|
| 1 | Baihetan Hydropower Station on Jinsha River | 16 × 460 | 60 | 80 (hole) × 6 (layer) | 6 | >25 |

TABLE 1-continued technical characteristics of layered water-taking of stop log gate of representative built large hydropower station in China.

| Serial number | Project | Water-taking rate ($m^3/s$) | Amplitude of water level (m) | Number of stoplog gate | Single stoplog gate height (m) | stoplog gate top control water depth (m) |
|---|---|---|---|---|---|---|
| 2 | Xiluodu Hydropower Station on the Jinsha River | 18 × 424 | 60 | 90 (hole) × 4 (layer) | 12 | >25 |
| 3 | Nuozhadu Hydropower Station on Lancang River | 9 × 393 | 47 | 36 (hole) × 3 (layer) | 12.68 | >29 |
| 4 | Huangdeng Hydropower Station on Lancang River | 4 × 405.02 | 33 | 20 (hole) × 3 (layer) | 9 | >23 |
| 5 | Jinping Hydropower Station on Yalong River | 6 × 337 | 80 | 24 (hole) × 3 (layer) | 14, 7 | >20 |
| 6 | Guangzhao Hydropower Station on Beipan River | 4 × 217 | 54 | 6 (hole) × 20 (layer) | 3 | >15 |
| 7 | Tankeng Hydropower Station of Oujiang River | 3 × 213 | 40 | 6 (hole) × 8 (layer) | 5 | >15 |

For the existing stoplog gate which is commonly adopted, the stoplog gate is usually operated by movable opening and closing equipment such as a gantry crane and a trolley, the arrangement mode is 'one machine with a plurality of gates', one opening and closing equipment needs to grab gates with different hole openings, and therefore the opening and closing equipment needs to grab the stoplog gate or the integral gate with different gate holes through grabbing beams at different moments. Because the gate is opened and close for underwater operation, can receive the influence that the diversion electricity generation overflows the water velocity of flow, and transfer the degree of depth great, the headstock gear snatches the stoplog gate in-process and can exist: the remote control method has the advantages that the remote control realization difficulty is high due to various uncertain risk factors such as the fact that the grabbing beam is unbalanced and swings easily caused by too high lowering or lifting speed, the grabbing beam is clamped by the gate groove, the entering groove is aligned, the stop log gate is difficult to pass through the shaft in underwater positioning, and the like, and the local control is usually adopted, so that the working intensity in of field workers is too high, and the efficiency is too low; the dispatching fault tolerance rate is poor due to frequent operation, once the stop log gate is misplaced and clamped in the operation process, the operation time of the stop log gate is greatly prolonged, and certain influence is generated on the operation safety and the power generation benefit of a power station; taking a certain constructed hydropower station as an example, 36 stoplog gates are arranged on the same water retaining layer of a water inlet of the hydropower station in the horizontal direction, and due to the reasons of large quantity of stoplog gates, common gate machines, incapability of operating at night, high operating strength and the like, about 9 days are consumed for normally lowering a layer of gate leaves, the power of a motor of the gate machine is high, and the gate machine is always in an operating state during water taking, so that the energy consumption is high; in addition, because all the gate leaves of each stoplog gate are positioned in one gate groove, the gate leaves can be extracted downwards step by step to take the upper water body or lowered step by step to block the lower water body. Through engineering practice, the existing stoplog gate technology which is commonly adopted has the defects of complex operation, long consumed time, large energy consumption and incapability of meeting the requirement of taking water at any depth, and is particularly more prominent in hydropower engineering with multiple water inlets. To the layering water-taking technique that sets up the multilayer water-taking mouth, need to set up multilayer water-taking runner from last to down in proper order in the water-taking mouth along the water flow direction, set up the gate in every layer of runner, control the gate in every layer of runner through headstock gear, need stagger because of every layer of flow channel gate is in the water flow direction position, this can increase the water-taking mouth along water flow direction length, be applicable to the not big reservoir of water-taking degree of depth generally, otherwise can be more because of the too big increase investment of water-taking mouth length, but can realize partial within range water-taking, nevertheless open and close to move water operation because of the gate, its headstock gear capacity is great, motor power leads to the energy consumption big greatly, and the time of opening and close the gate is still longer, the operating efficiency is lower. Although the louver type technology adopted by some foreign projects can meet any water taking requirements in a certain range, such as American Sassian tower hydropower station, the louver type technology is fixed, the louver is easy to damage after long-term underwater operation, water needs to be drained for maintenance to reduce the water level to be below the bottom sill elevation of a water inlet, so that water resources are wasted, a steel structure frame is required to surround a water inlet tower or a water taking tower on three sides, the steel consumption is large, and the economy is poor; therefore, the prior art has defects and needs to be further improved.

SUMMARY OF THE DISCLOSURE

The disclosure mainly aims to provide an efficient and quick stepless layered water-taking gate device, and aims to solve the technical problems.

In order to achieve the purpose, the disclosure provides a high-efficiency and quick stepless layered water-taking gate device, which comprises water-taking gate grooves which are oppositely arranged on two sides of a water inlet on a dam body, and is characterized in that: a plurality of sections of gate leaves are arranged in the water taking gate groove from bottom to top; all the gate leaves in the water-taking gate groove are divided into a group, and the adjacent gate leaves are connected by adopting an internode connecting plate to form an integral water-taking gate; or all the gate leaves in the water-taking gate groove are divided into a plurality of groups to form a plurality of sets of stop log type water-taking gates, each set of stop log type water-taking gate is provided with a plurality of sections of gate leaves, and adjacent gate leaves are connected by an internode connecting plate; each section of gate blade comprises a movable gate flap and a flow gate, and the movable gate flap is rotatably arranged on the upstream side of the flow gate; each section of gate leaf is provided with a movable gate clack opening and closing device for driving the movable gate clack to open or close; and a gantry crane or a trolley used for lifting or lowering the integral water-taking gate or the stoplog type water-taking gate is arranged at the top of the dam body.

Preferably, the movable gate clack opening and closing device is an electric push rod or a double-acting oil pump and oil cylinder integrated hydraulic machine; one end of the electric push rod or the double-acting oil pump oil cylinder integrated hydraulic machine is hinged on the movable gate flap, and the other end of the electric push rod or the double-acting oil pump oil cylinder integrated hydraulic machine is hinged on the flow channel gate.

Preferably, a rotating hinge plate is arranged on the movable gate flap, and a fixed hinge plate is arranged on the flow channel gate; the rotary hinged plate is rotationally connected with the fixed hinged plate by a pin shaft; when the rotating hinge plate is arranged at the lower part of the movable gate flap, the fixed hinge plate is arranged at the lower part of the flow gate, an upper hanging point of the electric push rod or the double-acting oil pump oil cylinder integrated hydraulic machine is connected with a hanging plate at the top of the flow gate through a pin shaft, and a lower hanging point is connected with a lifting lug of the movable gate flap through a pin shaft; when the rotating hinge plate is arranged on the upper part of the movable gate flap, the fixed hinge plate is arranged on the upper part of the flow channel gate, the lower hanging point of the electric push rod or the double-acting oil pump oil cylinder integrated hydraulic machine is connected with the hanging plate at the bottom of the flow channel gate through a pin shaft, and the upper hanging point is connected with the lifting lug of the movable gate flap through a pin shaft.

Preferably, when the flap is rotatably mounted at the left or right end of the upstream side of the flow gate: a rotary hinge plate is arranged at the upper part of the left end or the right end of the movable gate flap, a fixed hinge plate is arranged on the flow channel gate corresponding to the rotary hinge plate, and the rotary hinge plate is rotatably connected with the fixed hinge plate by a pin shaft; a mushroom shaft head is arranged at the lower part of the left end or the right end of the movable gate flap, a bottom pivot is arranged on the flow channel gate corresponding to the position of the mushroom shaft head, and the bottom pivot is rotatably connected with the mushroom shaft head; the front hanging point of the electric push rod or the double-acting oil pump oil cylinder integrated hydraulic machine is connected with the lifting lug of the movable gate flap through a pin shaft, and the rear hanging point is connected with the hanging plate on the side part of the flow channel gate through a pin shaft.

Preferably, the movable gate flap comprises a movable gate plate, a frame-shaped water sealing device and a supporting bar; the frame-shaped water sealing device is arranged on the surface of the downstream side of the movable gate plate; the supporting bars are arranged on the surface of the downstream side of the movable gate plate and positioned on the left side and the right side of the frame type water sealing device; when the movable gate flap is in a closed water retaining state, the supporting bar abuts against the surface on the upstream side of the flow channel gate; the support bars are used for preventing the frame-shaped water sealing device from being compressed excessively.

Preferably, a frame-shaped water stops seat plate corresponding to the frame-shaped water sealing device is arranged on the upstream side surface of the flow channel gate; when the movable gate flap is in a closed water retaining state, the frame-shaped water sealing device is abutted against the frame-shaped water retaining seat plate.

Preferably, the movable gate flap further comprises an L-shaped P-head water sealing device or a vertically arranged P-head water sealing device; the L-shaped P-head water sealing device or the vertically-arranged P-head water sealing device is arranged on the surface of the upstream side of the movable gate plate close to the left end and the right end; and water stop seat plates are respectively arranged on the side walls on the two sides of the upstream of the water-taking gate groove of the water inlet, and the L-shaped P-head water sealing device or the vertically arranged P-head water sealing device is matched with the water stop seat plates for water sealing.

Preferably, the flow channel gate is formed by welding an upper cross beam, a lower cross beam and box-type side columns on the left side and the right side, and a steel-structure runner hole with a closed runner surface is formed in the flow channel gate; a supporting vertical beam is arranged inside the box-type side column; the positions of the supporting vertical beams correspond to the positions of the supporting bars on the movable gate plates.

Preferably, the overflow upstream surface and the water outlet surface of the upper cross beam, the lower cross beam, the box-type side columns on the left side and the right side are rounded.

Preferably, the box-type side column is a groove-shaped structural beam or a chute-shaped structural beam formed by welding an upstream side vertical flange plate, an outer side web plate, an inner side web plate and a downstream side vertical flange plate; when the box-type side column is a chute-type structural beam, the inner side web is inclined, so that the sectional area of the steel structure runner hole is gradually increased from the upstream side to the downstream side.

Preferably, a manhole is arranged in the middle of an outer web of the box-type side column, connecting holes are respectively formed in two ends of the outer web, and the internode connecting plate is installed by penetrating through the connecting holes through bolts or pin shafts; and the outer side web plate is also provided with an installation operation hole.

Preferably, the surface of the downstream side of the flow gate is provided with side water sealing devices at positions close to two ends respectively; the side water seal device is matched with a track surface at the downstream side of the water taking gate groove to seal and stop water; a bottom water seal device is arranged on the lower part of the surface on the downstream side of the flow channel gate; a bottom water seal supporting seat plate is arranged on the upper part of the surface of the downstream side of the flow channel gate; the bottom water seal supporting seat plates of the upper and lower adjacent flow channel gates are matched with the bottom water seal device to seal and stop water.

Preferably, reverse supports are respectively arranged on the surface of the upstream side of the flow channel gate close to the positions of the two ends; the surface of the downstream side of the flow channel gate is provided with a forward support and a lateral support at positions close to the two ends respectively; the reverse support and the forward support are matched with the upstream and downstream rail surfaces of the water taking gate groove for supporting and limiting; the lateral support is matched with a lateral wall track surface of the water inlet to limit, and the lateral support is of a roller structure.

Preferably, the gantry crane or the trolley is provided with a hydraulic grabbing beam; and a lifting lug plate and a positioning device which are matched with the hydraulic grabbing beam are arranged at the top of the flow channel gate of the gate leaf.

Preferably, the movable gate clack opening and closing device in each section of gate leaf is connected and controlled through a cable; a monitoring instrument is arranged on the flow channel gate of each section of gate leaf and is used for monitoring and observing water temperature and/or water quality; and locking plates are respectively arranged at two ends of the flow channel gate, a cable limiting sliding barrel is arranged on each locking plate, and a cable of the movable gate flap opening and closing device and a signal wire of a monitoring instrument are arranged in the cable limiting sliding barrel.

Preferably, the cable limiting sliding cylinder comprises a cable limiting sliding groove and a cable limiting sliding groove baffle, the cable limiting sliding groove is in an open U-shaped shape with a right-angled hem, the cable limiting sliding groove baffle is connected with the cable limiting sliding groove through a bolt, and the cable limiting sliding groove baffle is used for forming a closed U-shaped closed ring cylinder with the cable limiting sliding groove and limiting the cable and the signal line in the cable limiting sliding groove.

Preferably, a locking beam is arranged at the notch position at the top of the water taking gate groove, and the locking beam is of a bridge structure.

Preferably, a communication hole is formed in the vertical beam of the movable gate flap.

Preferably, a grid is arranged in the flow channel gate, and the cross section of the grid is of an upstream and downstream round-head rectangular bar structure or an upstream and downstream streamline-head rectangular bar structure.

Preferably, the water stop seat plate comprises an upper water stop seat plate and a lower water stop seat plate; the height of the lower water stop seat plate is greater than the top of the gate, and the width of the lower water stop seat plate is greater than the length of the water seal when the movable gate flap is fully opened; the width of the upper water stop seat plate corresponds to the position of the L-shaped P-head water seal device or the vertically arranged P-head water seal device when the movable gate flap is in a closed state.

Due to the adoption of the technical scheme, the disclosure has the following beneficial effects:

(1) each section of gate leaf of the layered water-taking gate device consists of a movable gate clack and a flow channel gate for supporting the movable gate clack, the movable gate clack is used as a movable gate clack opening and closing device through a double-acting oil pump oil cylinder integrated integral hydraulic machine or an electric push rod arranged inside the flow channel gate, internode connecting plates are connected between the gate leaves to form an integral water-taking gate or a plurality of sets of stop-log type water-taking gates, and the integral water-taking gate or the stop-log type water-taking gate is opened and closed by a gate machine or a trolley arranged at the top of a water inlet gate well. During the operation, the movable gate flap is partially opened or fully opened and fully closed through a movable gate flap opening and closing device arranged in the flow channel gate to adjust the water taking depth, because the integral water taking gate or the stoplog type water taking gate and the movable gate flap both adopt independent opening and closing equipment, compared with the traditional technology of gradually taking water layer by layer and moving a gate lifting hole to a gate warehouse to store or lock the gate ceiling on the top of a gate well, the ubiquitous opening and closing equipment has higher lift, can reach more than 80 m for high-water-level hydroelectric engineering, and has the defects of complex operation, long time consumption and the like for operating 1 gate step by step for several hours or even several days, the disclosure can open and close the movable gate flap of each section of gate leaf of the integral water taking gate or the stoplog type water taking gate at any opening degree between 0 and 90 degrees, and can open and close any movable gate flap or different combined movable gate flaps or all movable gate flaps at the same time to realize stepless layering except that the operation is quick and convenient, because the gate leaf does not need to be lifted out of the orifice, the stroke for opening and closing the movable gate leaf is very short and generally does not exceed 2 m, so the operation time of the whole process is very short and can be generally completed within 10 minutes, and the requirement of stepless layered water taking at any depth in a large water depth range of the water-taking of the reservoir is efficiently and quickly realized.

(2) According to the disclosure, each section of gate leaf is provided with a monitoring instrument for monitoring and observing water temperature and/or water quality, so that the water temperature and water quality conditions at different heights can be mastered, the layered water taking effect of the gate can be evaluated in real time, data support is provided for the operation optimization of layered water taking measures, and accurate regulation and control of water temperature and water quality are realized.

(3) The two sides of the flow channel gate are provided with a locking plate and a detachable cable limiting sliding barrel, the cable limiting sliding barrel consists of a cable limiting sliding groove and a cable limiting sliding groove baffle, during gate maintenance, after an integral water-taking gate or a stoplog type water-taking gate is lifted to a locking beam at the top of a gate well through an opening and closing device arranged on the top of the gate, a bolt or a pin shaft and the cable limiting sliding groove baffle between gate leaves are removed, the cable and a signal wire are removed from the cable limiting sliding barrel and the gate leaves layer by layer, and under the condition that the lift above a gate well platform of the opening and closing device or the lift on a rail is not increased, all the gate leaves can be removed one by one and moved to a gate warehouse or an appointed position to realize maintenance.

(4) The movable gate flap consists of a movable gate plate, a frame-shaped water sealing device, an L-shaped P-shaped water sealing device or a vertically-arranged P-shaped water sealing device, wherein the frame-shaped water sealing device is arranged at the downstream side of the movable gate plate, so that the water pressure direction acting on the movable gate plate is consistent with the water sealing compression direction, and a frame-shaped water stopping seat plate corresponding to the frame-shaped water sealing device is arranged at the upstream side of the flow channel gate, so that the frame-shaped water sealing device keeps a certain compression amount under the condition of low water pressure and is favorable for sealing and stopping water; the two sides of the upstream of the movable gate plate are provided with L-shaped P-head water sealing devices or vertically arranged P-head water sealing devices, the upstream side wall of a water taking gate groove of the water inlet is provided with a water stop seat plate corresponding to the L-shaped P-head water sealing devices or the vertically arranged P-head water sealing devices in the rotating range of the movable gate flap, and when the movable gate flap is partially opened within the range of 0-90 degrees, water bodies can be prevented from entering the overflowing holes of the flow gate from the two sides; the vertical beam of the movable gate clack is provided with a communication hole, so that water in the beam lattice can be conveniently discharged when the movable gate clack runs; the movable gate flap is provided with a water seal limit stop block at the position of the L-shaped P-head water seal close to the side of the orifice of the cross beam or is provided with a water seal limit support plate at the rear part of a rubber pad of the vertically arranged P-head water seal device of the cross beam, so that the side water seal arranged at the upstream side of the movable gate flap can be prevented from deviating to the side of the orifice too much under the action of lateral pressure to cause a gap with a side wall and cannot seal water bodies at two sides from entering the flow channel gate; the stagnant water bedplate falls into stagnant water bedplate and lower stagnant water bedplate down, and lower stagnant water bedplate sets up the height and slightly is greater than the gate top, and the width is greater than the water seal length when the dodge gate lamella is full open, satisfies the dodge gate lamella and opens the water requirement in 0~90 within range, goes up the water seal position of upper reaches side when going up the stagnant water bedplate width and dodge gate lamella closed condition and corresponds, when satisfying the gate maintenance and open and close gate normal operating, can save the investment that the water inlet side wall gate buried the piece.

(5) The flow channel gate is by entablature, bottom end rail and about box side post welding constitute and flow over a confined steel construction runner hole to flow over the equal radius angle of upstream face and water outlet face overflowing, it is smooth and easy to have ensured that the flow channel gate flows when overflowing, then effectively alleviate the vibration of flow channel gate when overflowing.

(6) The two sides of the downstream of the flow channel gate are provided with side water seal devices, the bottom of the downstream side is provided with a bottom water seal device, and the top of the downstream side is provided with a bottom water seal supporting seat plate for supporting the bottom water seal device of the upper layer of the gate leaf, so that the two sides and the bottom of each gate leaf can be effectively sealed and sealed.

(7) The flow channel gate side column is provided with an inlet hole and a mounting operation hole of the gate leaf internode connecting device, so that cables and signal wires in the cable limiting sliding cylinder can pass through the inlet hole and the mounting operation hole of the gate leaf internode connecting device step by step from top to bottom, and then are connected with a movable gate clack opening and closing device corresponding to the movable gate clack to be operated and a monitoring instrument arranged in the flow channel gate; the cable of the movable gate clack opening and closing device and the signal line of the monitoring instrument are both provided with movable joints, so that the gate can be conveniently detached when lifted to the top of the gate groove hole.

(8) The upstream side of the flow channel gate is provided with a reverse support, and the downstream side of the flow channel gate is provided with a forward support and a lateral support, so that the normal operation of the movable gate flap is not interfered under the condition that the supporting and limiting mode in the opening and closing process of the layered water-taking gate is the same as that of the traditional gate.

(9) At the intake or the water inlet that the filth is few, when the velocity of flow of layering water-taking sluice gate groove is slower, through not influencing the position that opens and close the equipment operation of movable gate lamella in the flow gate and set up the bars piece, compromise the trash blocking when satisfying layering water-taking, effectively reduce the length of intake or water inlet, save trash blocking bars and the equipment investment of decontaminating. The cross section of the grid is of an upstream and downstream round-head rectangular bar structure or an upstream and downstream streamline-head rectangular bar structure, and when the flow channel gate overflows, the vibration of the grid is favorably reduced.

(10) The locking beam at the top of the grooved hole of the water taking gate adopts a bridge structure, so that a cable can conveniently penetrate out of the lower part of the locking beam; the distribution box of the movable gate clack opening and closing equipment is arranged on a platform, close to a grooved hole of a water taking gate, on the upper portion of a water taking port, so that the length of a cable can be reduced, and meanwhile, the movable gate clack opening and closing equipment is convenient to connect with the cable.

BRIEF DESCRIPTION OF THE DRAWINGS

In order to more clearly illustrate the embodiments of the present disclosure or the technical solutions in the prior art, the drawings used in the description of the embodiments or the prior art will be briefly described below, it is obvious that the drawings in the following description are only some embodiments of the present disclosure, and for those skilled in the art, other drawings can be obtained according to the structures shown in the drawings without creative efforts.

Figure 1:
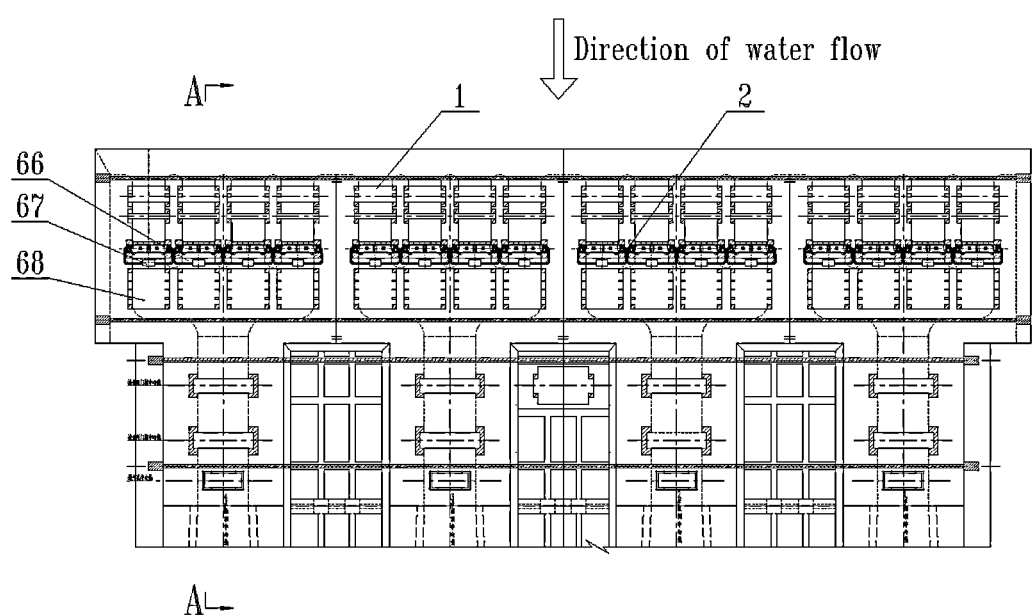
FIG. 1 is a schematic plan view of an embodiment 1 (an electrodeless stratified water-taking hydraulic flap gate apparatus with a lower part rotatably hinged) of the present disclosure.
Figure 2:
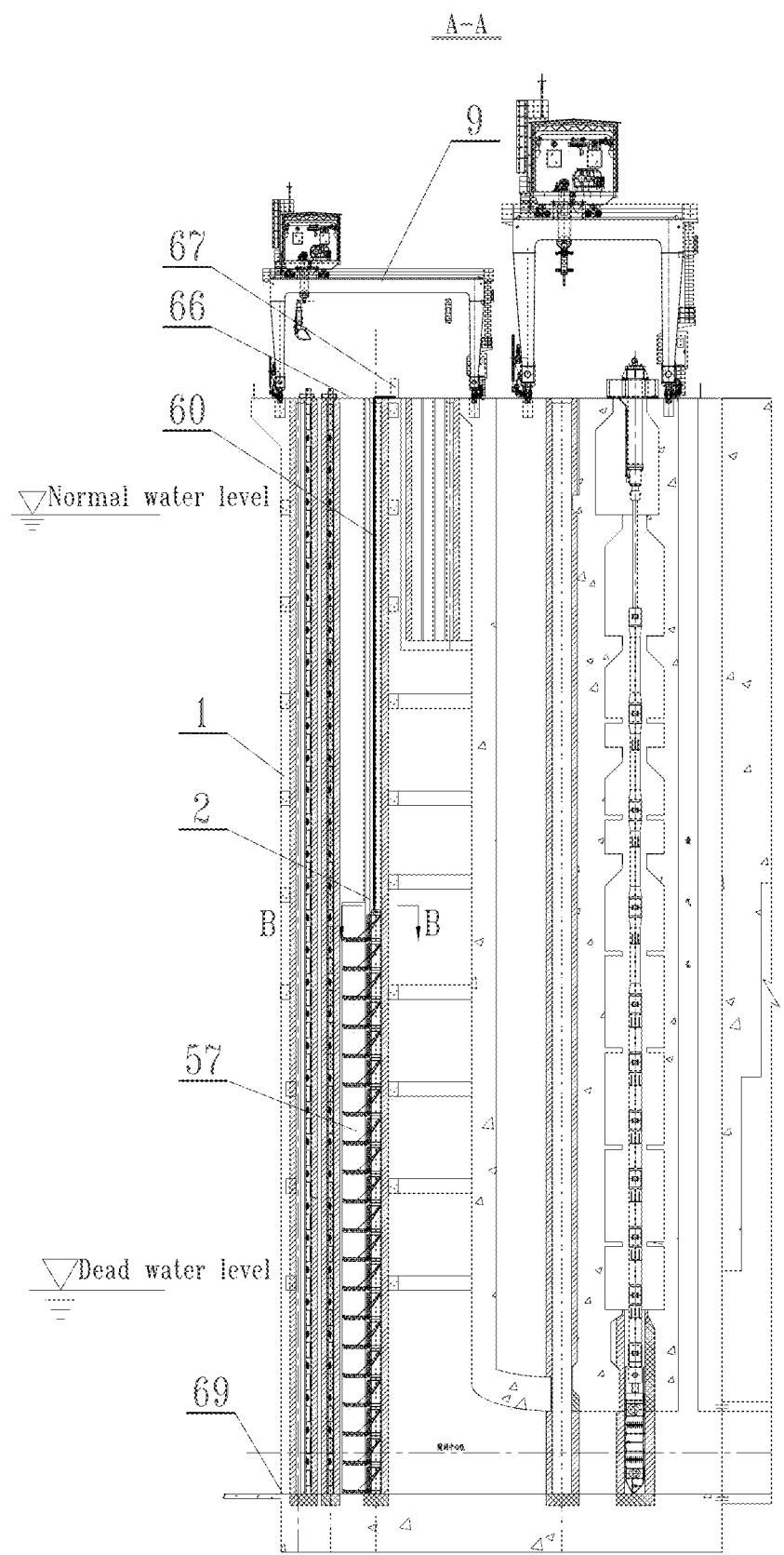
FIG. 2 is a cross-sectional view A-A of FIG. 1.
Figure 3:
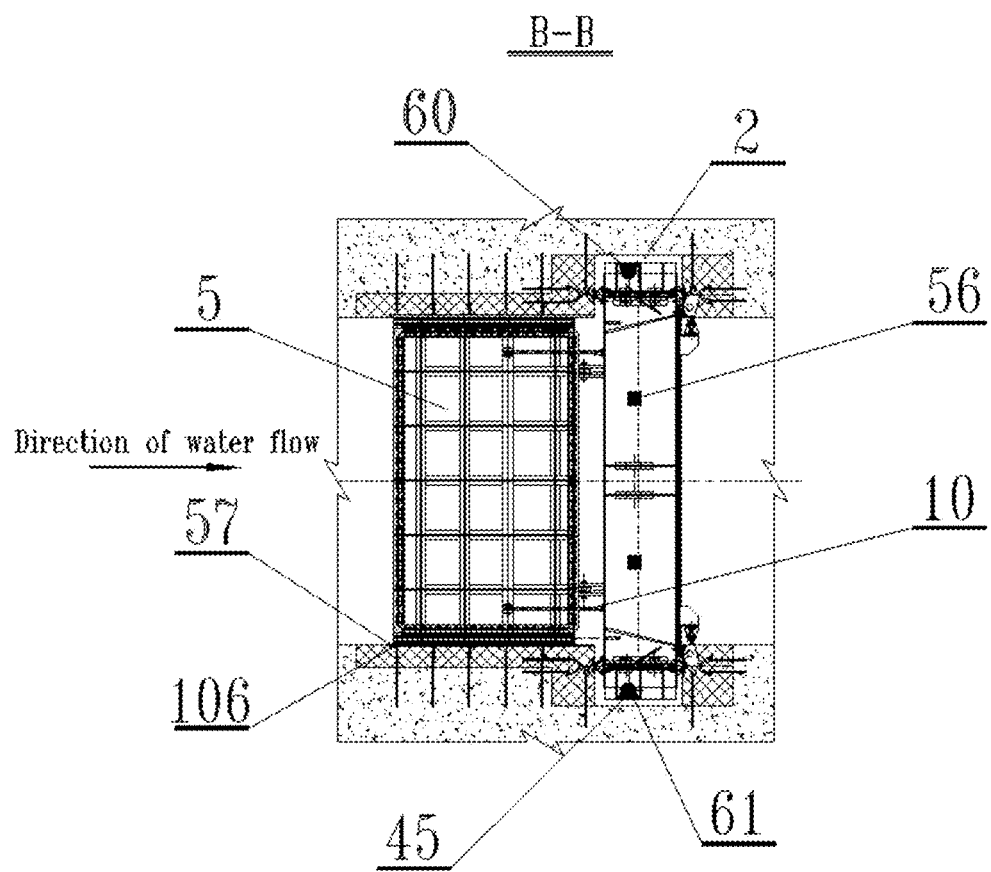
FIG. 3 is a cross-sectional view B-B of FIG. 2.
Figure 4:
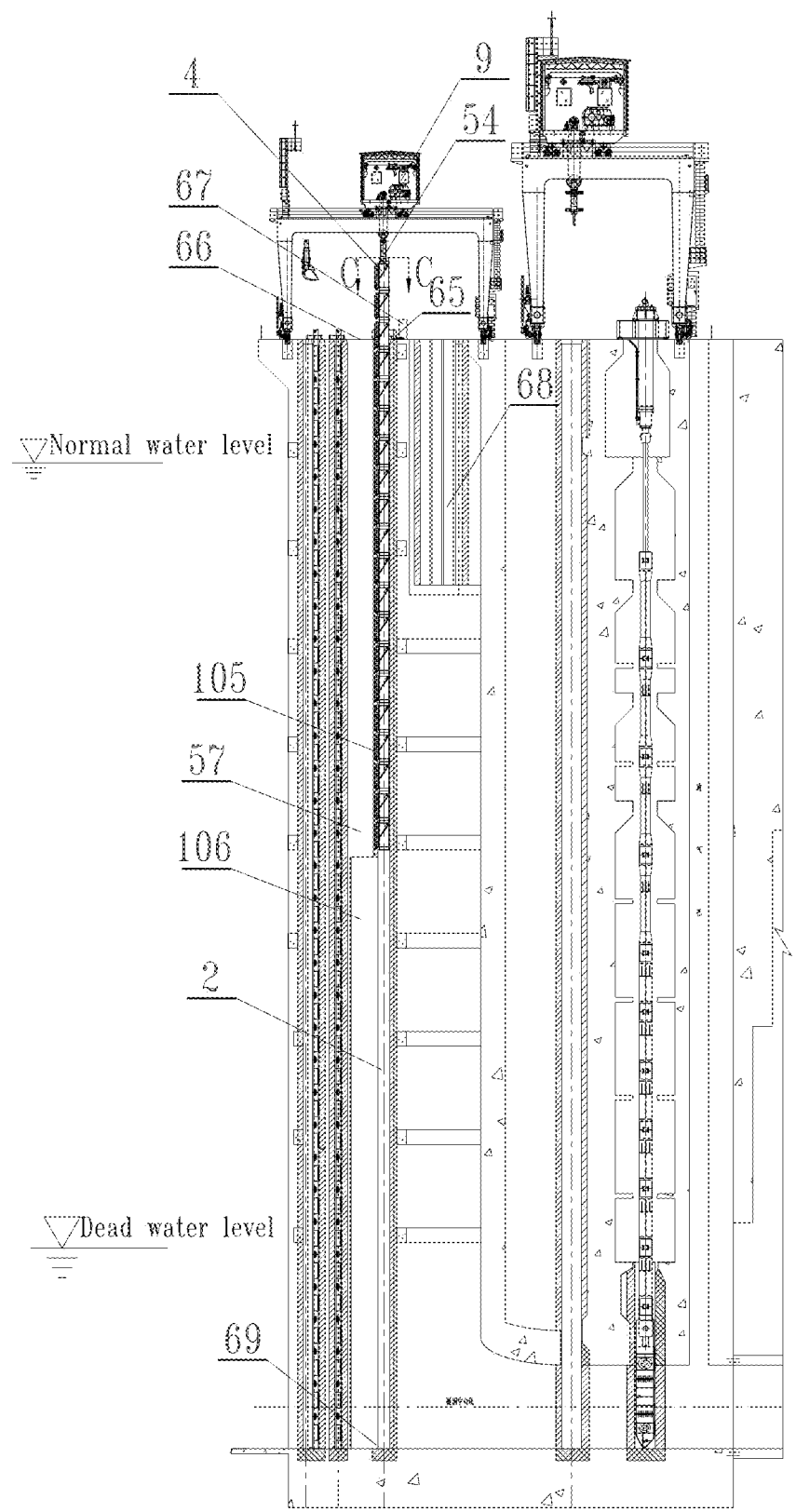
FIG. 4 is a schematic view showing the lifting of the integral type water-taking gate to the top of the groove of the gate in accordance with embodiment 1 of the present disclosure.
Figure 5:
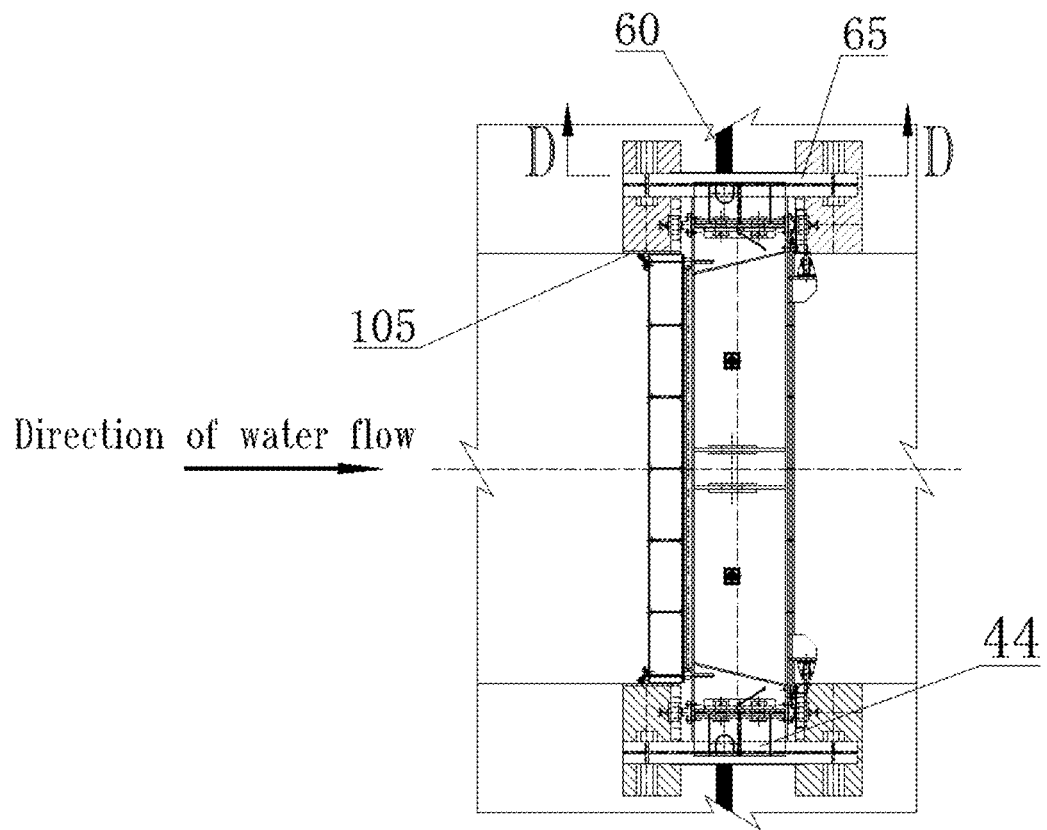
FIG. 5 is a cross-sectional view C-C of FIG. 4.
Figure 6:
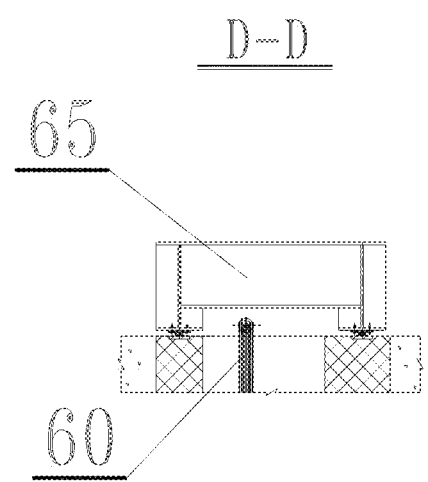
FIG. 6 is a cross-sectional view taken along line D-D of FIG. 5.
Figure 7:
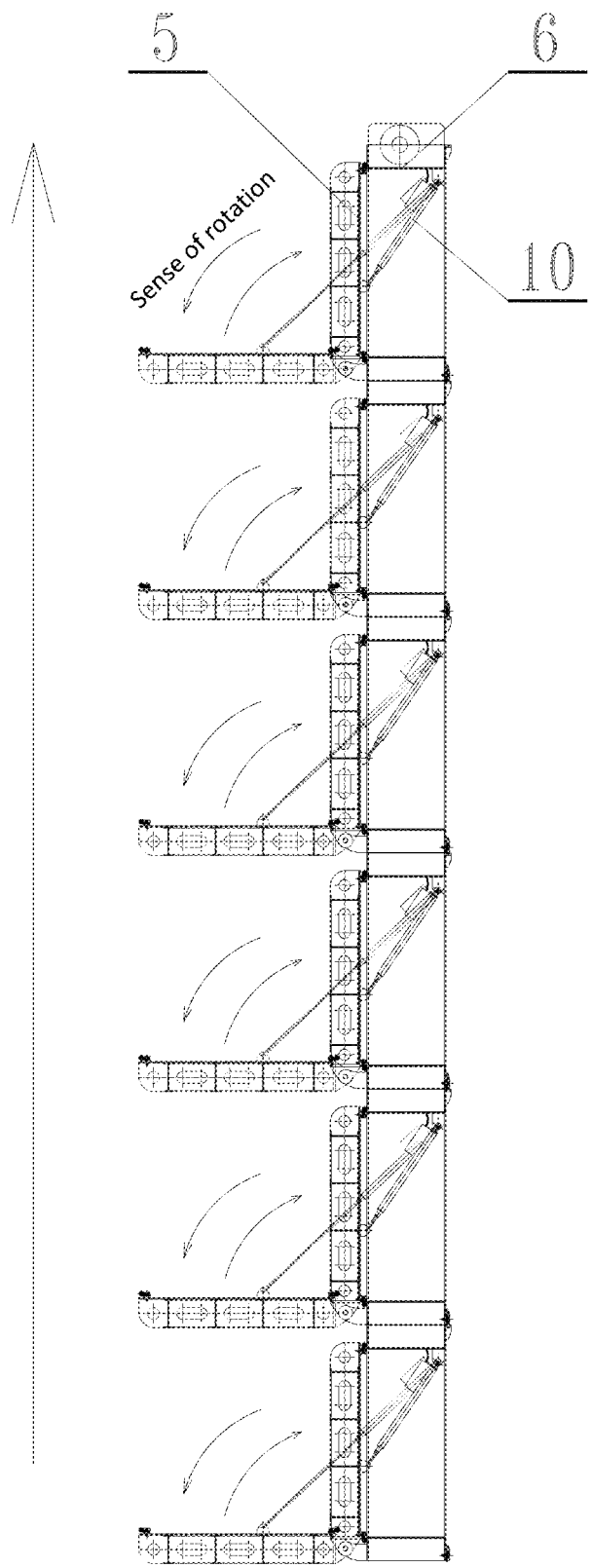
FIG. 7 is a schematic diagram of water-taking in the process of the movable gate flap in the fully opened or closed state according to embodiment 1 of the present disclosure.
Figure 8:
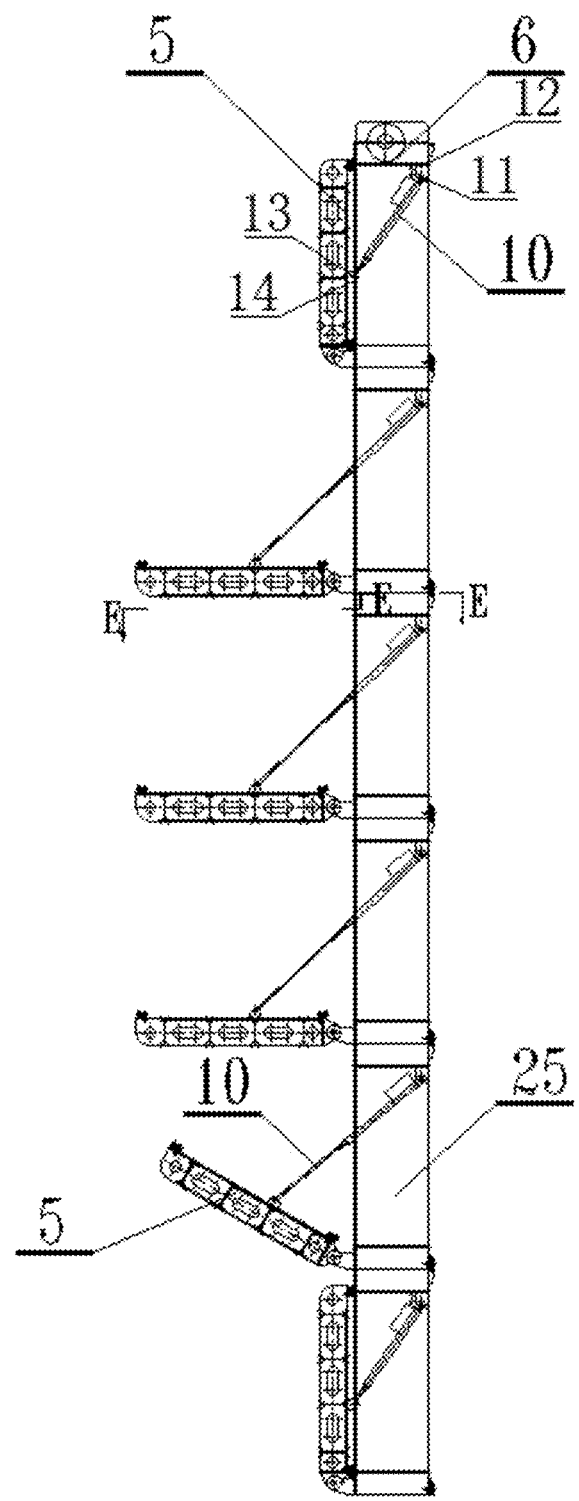
FIG. 8 is a schematic diagram of water-taking during the combined state of fully opening, partially opening and closing different movable flaps in embodiment 1 of the present disclosure.
Figure 9:
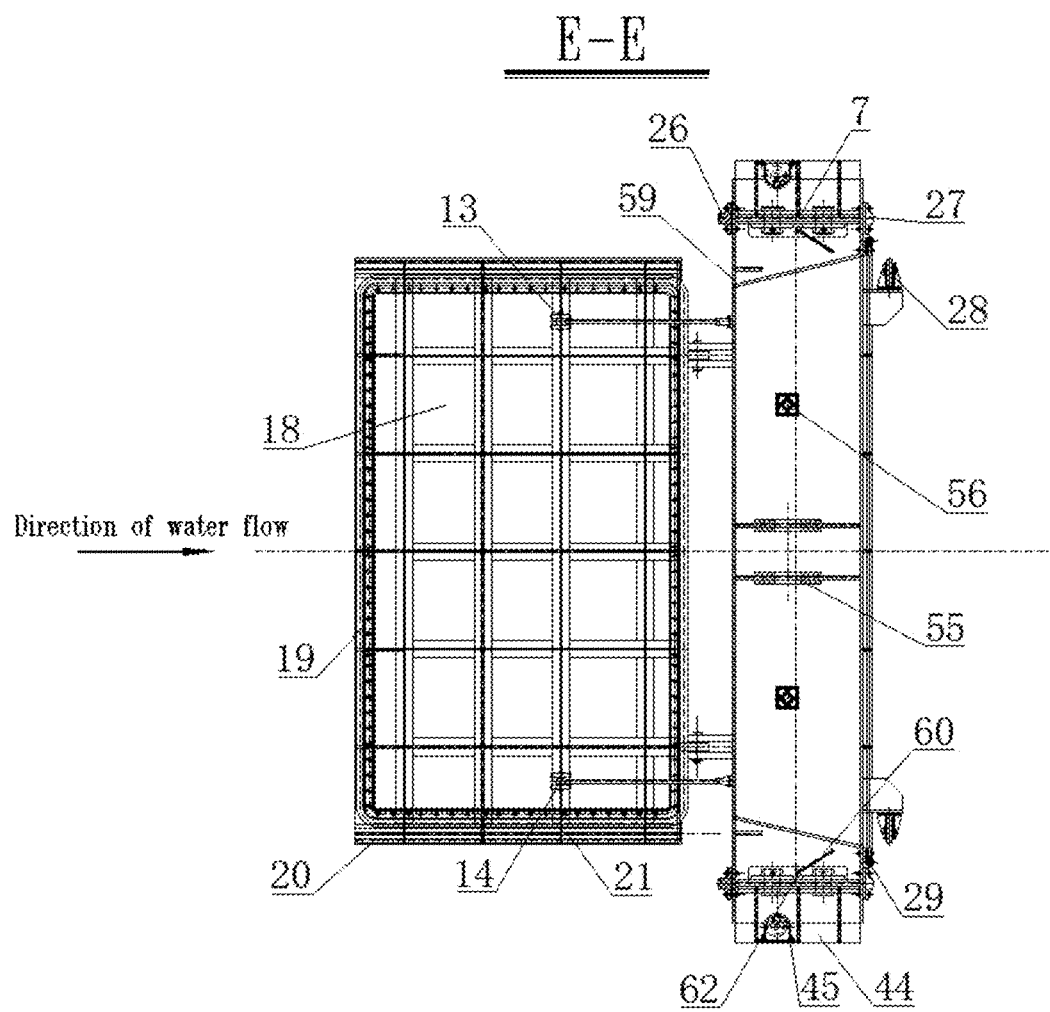
FIG. 9 is a cross-sectional view E-E of FIG. 8.
Figure 10:
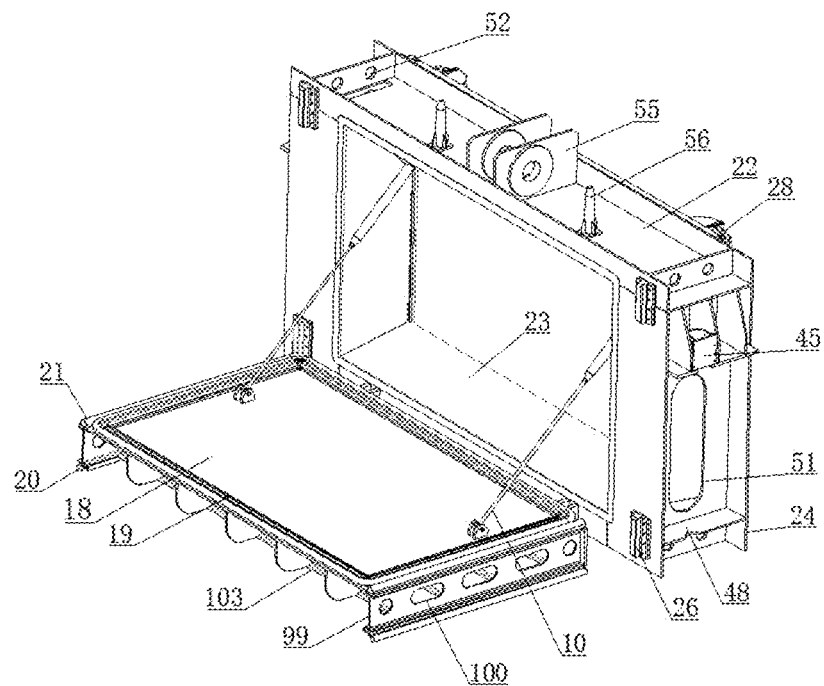
FIG. 10 is a first schematic perspective view of a gate leaf with a lifting lug and a positioning device according to embodiment 1 of the present disclosure.
Figure 11:
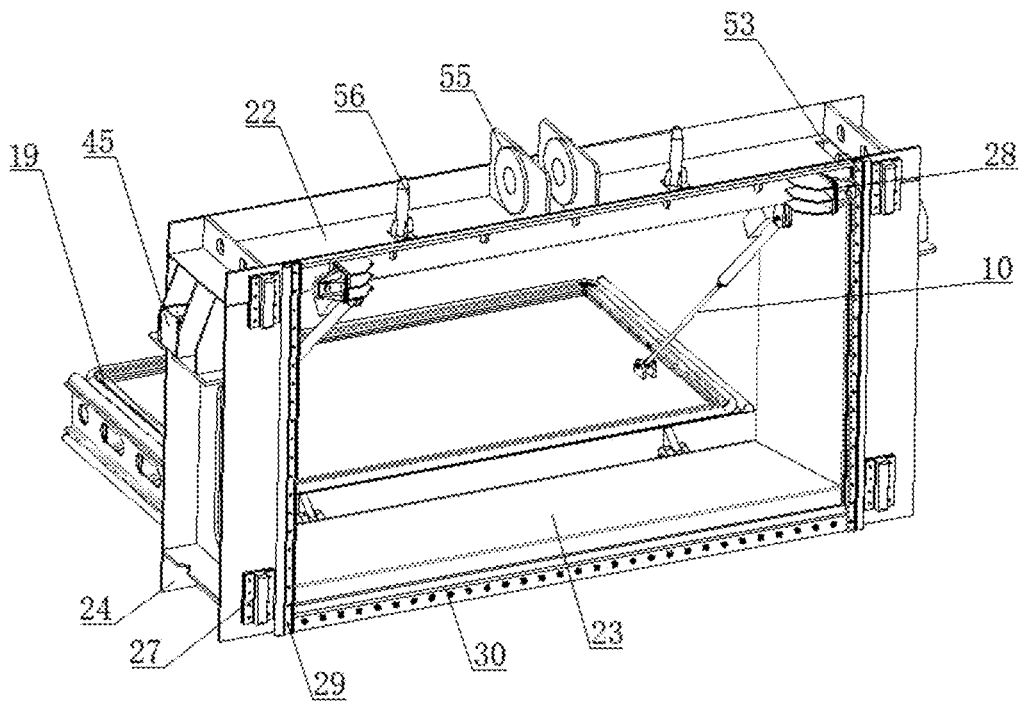
FIG. 11 is a schematic perspective view of a second gate leaf provided with a lifting lug and a positioning device in embodiment 1 of the present disclosure.
Figure 12:
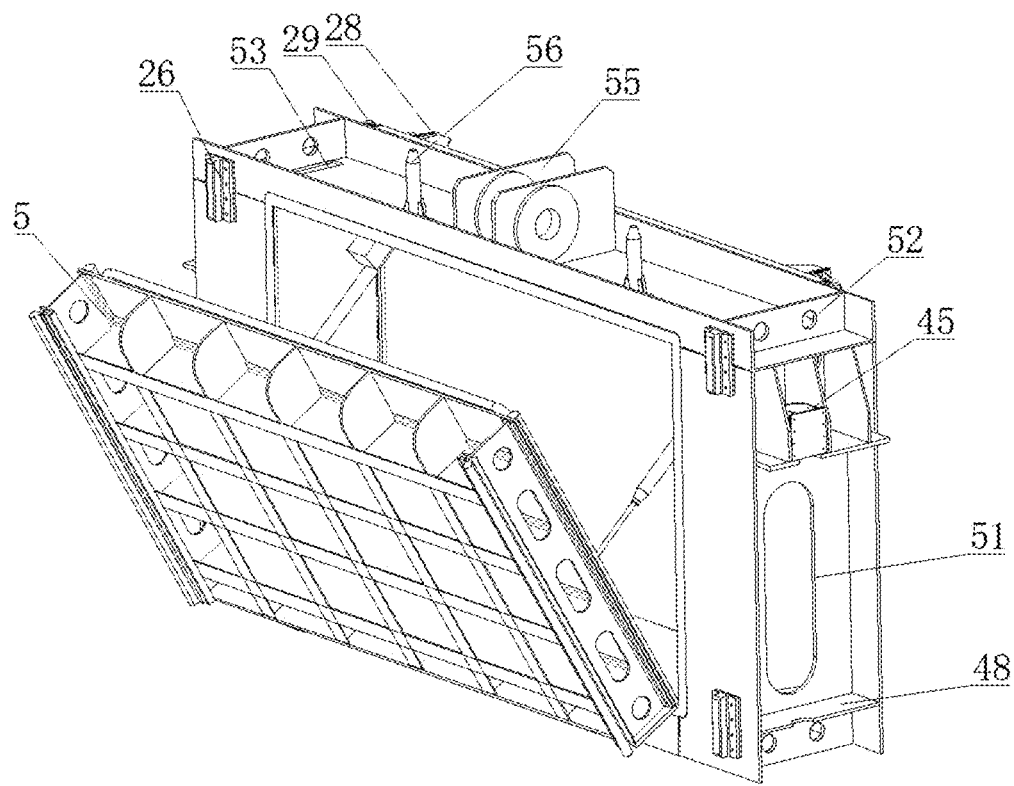
FIG. 12 is a third schematic perspective view of a gate leaf provided with a lifting lug and a positioning device in embodiment 1 of the present disclosure.
Figure 13:
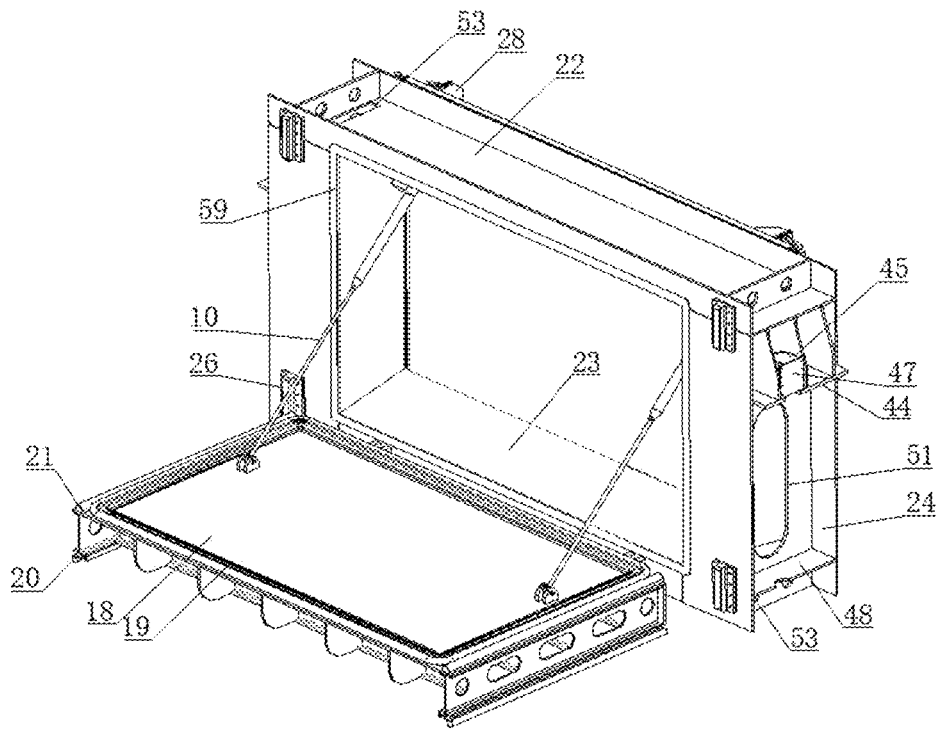
FIG. 13 is a first schematic perspective view of a middle gate leaf without a lifting lug and a positioning device according to embodiment 1 of the present disclosure.
Figure 14:
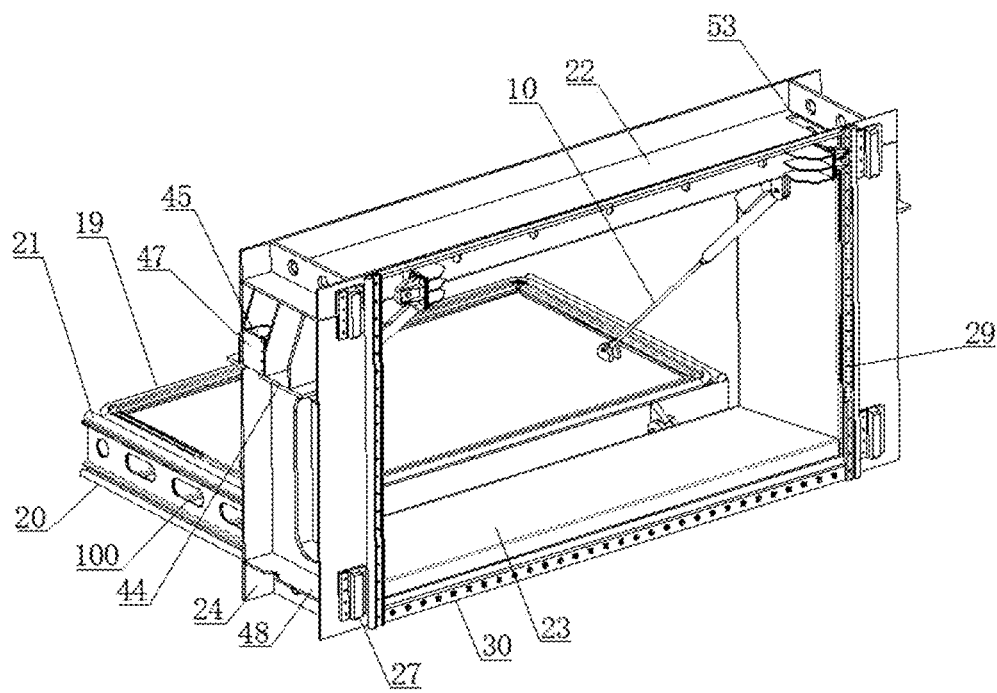
FIG. 14 is a schematic perspective view of a second intermediate gate leaf without a lifting lug and a positioning device in embodiment 1 of the present disclosure.
Figure 15:
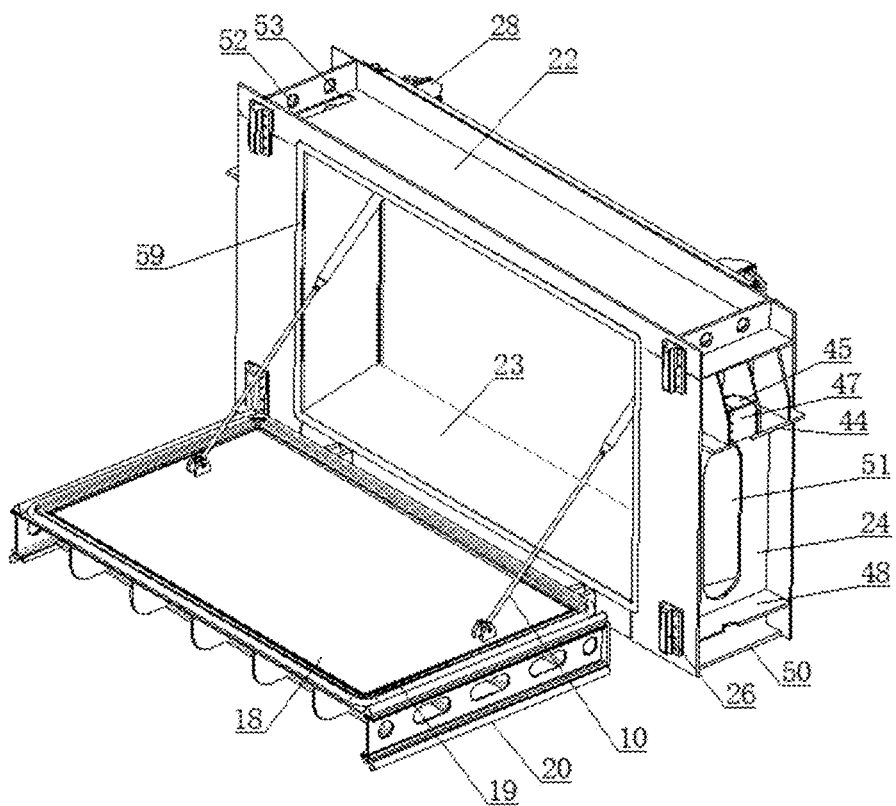
FIG. 15 is a first perspective view of a lower segment gate leaf in example 1 of the present disclosure.
Figure 16:
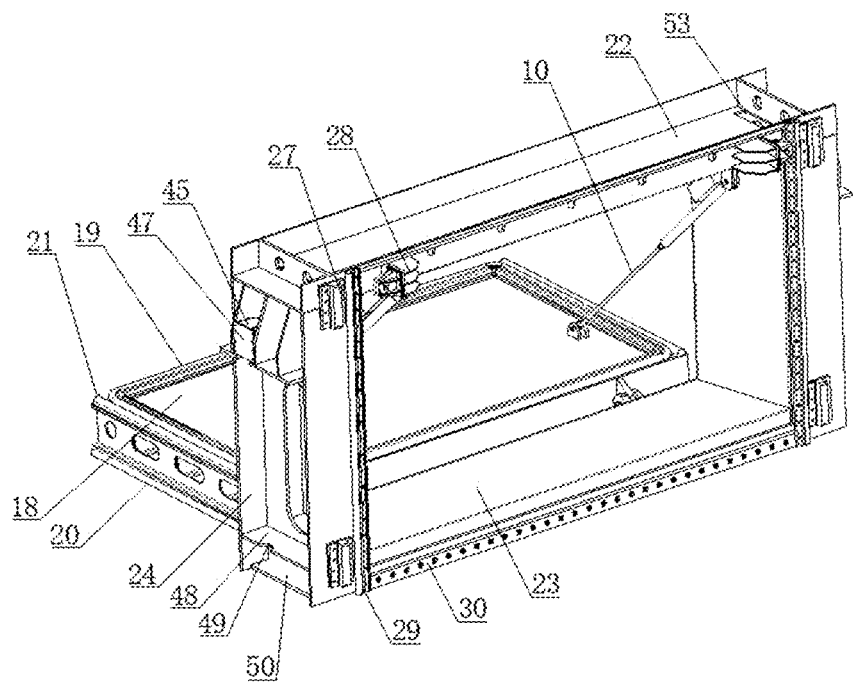
FIG. 16 is a second perspective view of a lower gate leaf in example 1 of the present disclosure.
Figure 17:
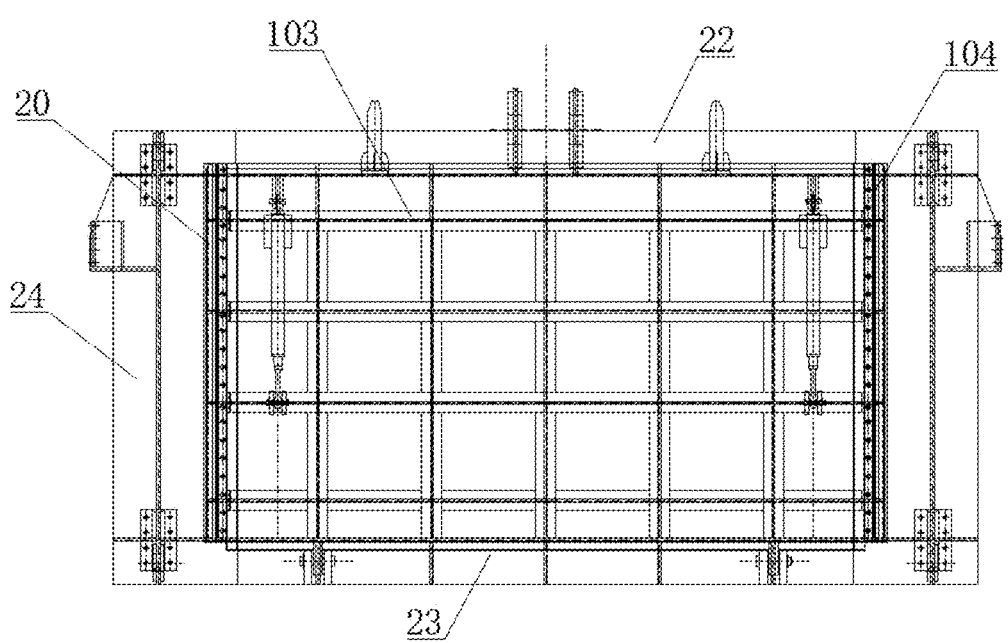
FIG. 17 is an upstream view of a gate leaf in example 1 of the present disclosure.
Figure 18:
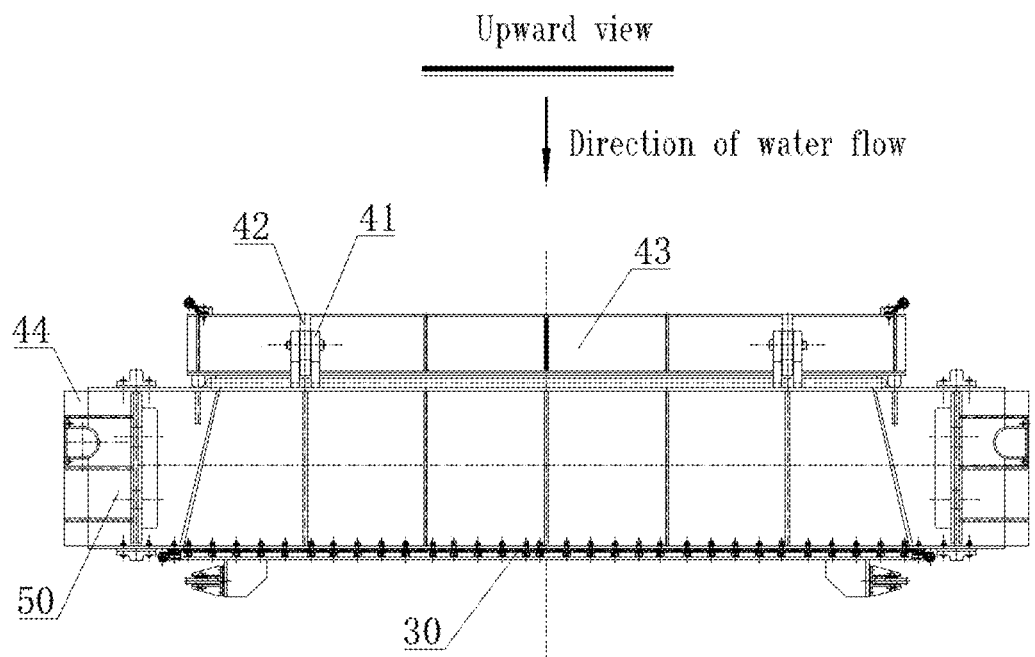
FIG. 18 is a bottom view of a gate leaf in accordance with embodiment 1 of the present disclosure.
Figure 19:
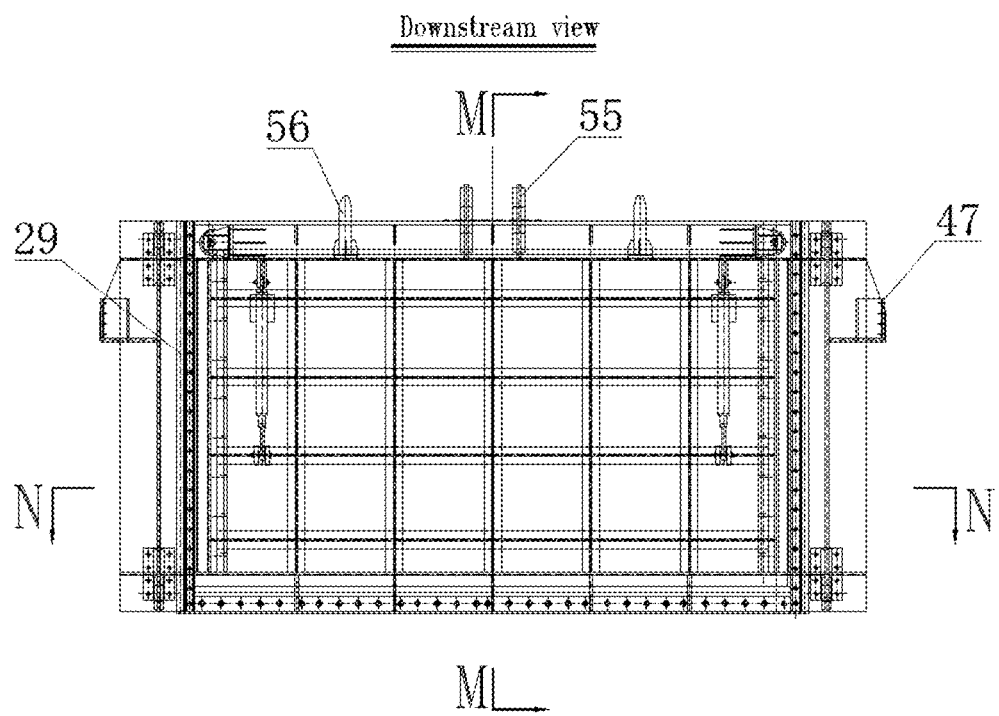
FIG. 19 is a downstream view of a gate leaf in example 1 of the present disclosure.
Figure 20:
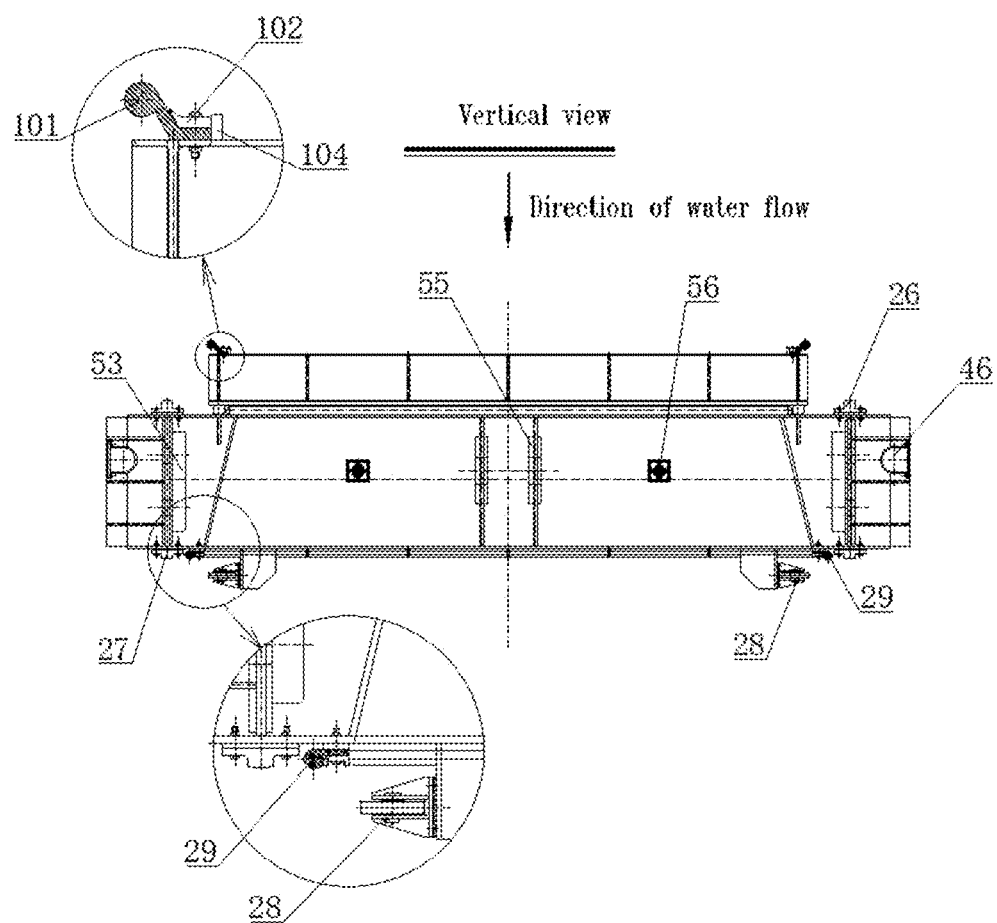
FIG. 20 is a top view of a gate leaf in example 1 of the present disclosure.
Figure 21:
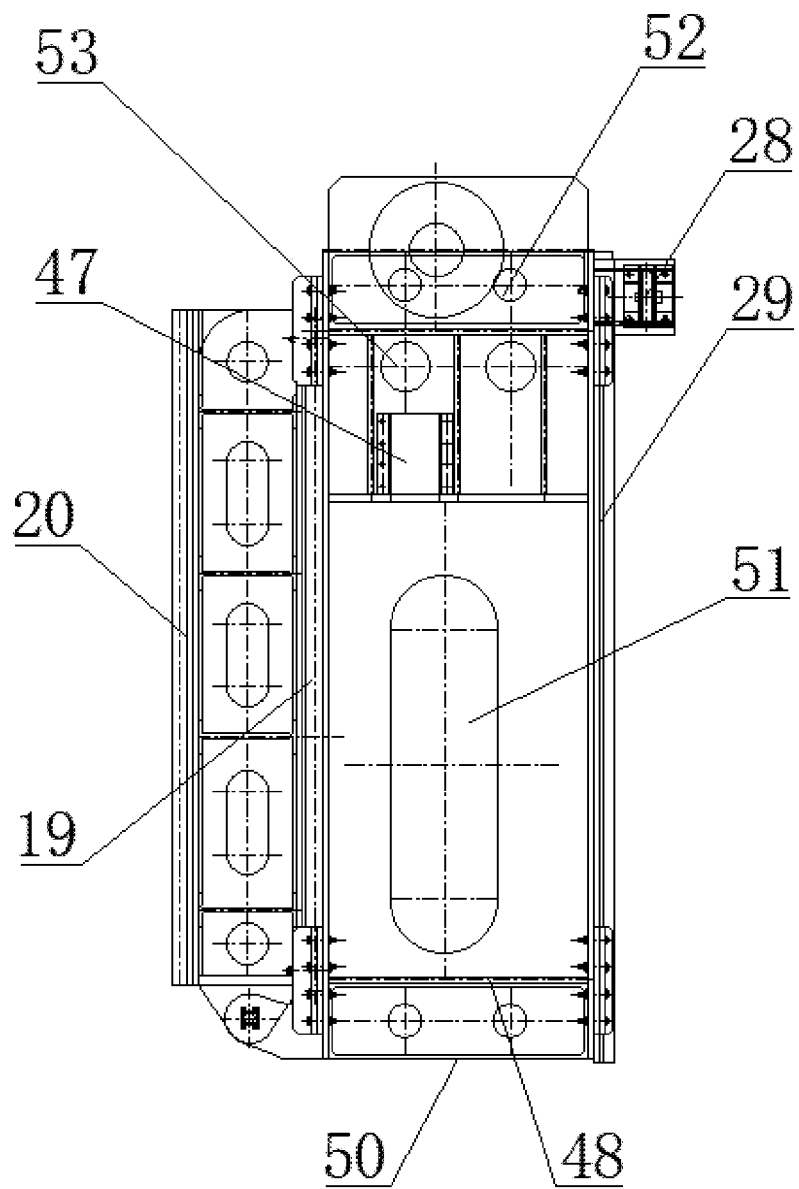
FIG. 21 is a side view of a gate leaf in example 1 of the present disclosure.
Figure 22:
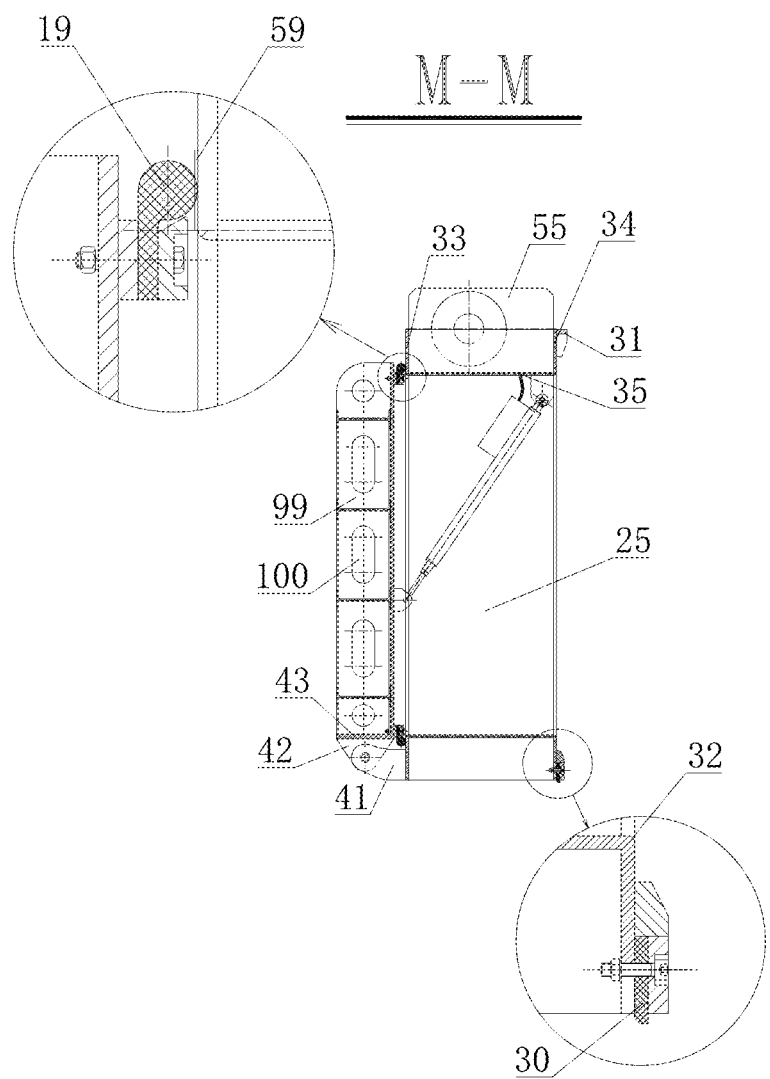
FIG. 22 is a cross-sectional view M-M of FIG. 19.
Figure 23:
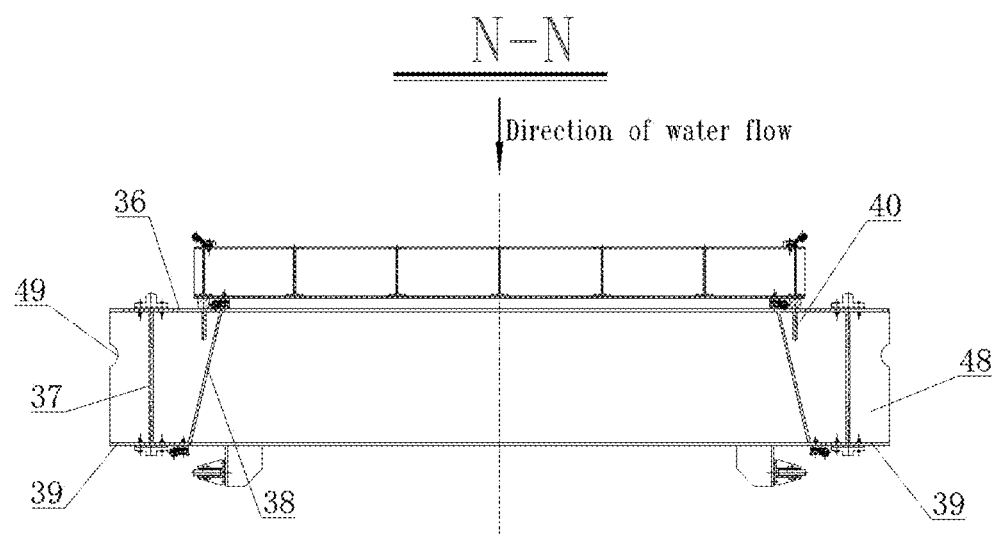
FIG. 23 is a cross-sectional view N-N of FIG. 19.

The reference numbers illustrate: 1—a water inlet; 2—water taking gate groove; 4—leaf of the gate; 5—movable gate flaps; 6—a flow gate; 7—internode connecting plate; 9—a gantry crane; 10—a movable gate clack opening and closing device; 11—hanging points; 12—a hanger plate; 13—hanging point; 14—a lifting lug; 15—lower leaf; 16—middle leaf of the portal; 17—upper leaf; 18—a movable gate plate; 19—frame type water seal device; 20—L type P head water seal device; 21—supporting bars; 22—upper beam; 23—a lower cross beam; 24—box-type side columns; 25—steel structure runner holes; 26—reverse support; 27—forward support; 28—lateral support; 29—side water seal device; 30—bottom water seal device; 31—bottom water seal supporting seat board; 32—rounding off; 33—upstream lateral flange plate; 34—downstream lateral flange plate; 35—a web; 36—upstream side vertical flange plate; 37—outboard webs; 38—inboard web; 39—downstream side vertical flange plate; 40—supporting vertical beams; 41—fixed hinge plate; 42—rotating hinge plate; 43—a base plate; 44—locking plate; 45—cable limiting sliding cylinder; 46—cable limiting chute; 47—cable position-limiting chute baffle; 48—a reinforcement plate; 49—arc notch; 50—a support plate; 51—manhole; 52—connecting hole; 53—installing an operation hole; 54—hydraulic gripping beam; 55—a lug plate; 56—a positioning device; 57—side wall; 58—water stop seat board; 59—frame type water stop seat board; 60—a cable; 61—signal lines; 62—a movable joint; 63—cable hole; 64—plastic cover; 65—locking beam; 66—maintenance platform; 67—a distribution box; 68—a gate store; 69—gate sill; 70—mushroom stub shafts; 71—front hanging points; 72—rear hanging point; 73—bottom pivot; 74—top circular shaft seat section; 75—a middle shaft section; 76—a frustum cone transition shaft section; 77—hemisphere segment; 78—fixed seat board; 79—screw holes; 80—bolt; 81—self-lubricating composite spherical bearing; 82—gate groove support; 83—screw; 84—an upstream-side restrictor plate; 85—limiting plates on two sides; 86—bottom support plate; 87—a threaded hole; 88—head collision; 89—stacking a beam water taking gate; 90—lower stoplog water-taking gate; 91—limiting sliding cylinder for cables at upstream side; 92—downstream side cable limit slide cylinder; 93—upper folding beam water-taking gate cable; 94—signal line of upper beam water taking gate; 95—folding a plastic sleeve of the beam intake gate; 96—lower stoplog water-taking gate cable; 97—lower stoplog water taking gate signal line; 98—plastic sleeve of lower stoplog water-taking gate; 99—vertical beams; 100—communicating holes; 101—L type P head water seal; 102—water sealing pressing plate; 103—a cross beam; 104—water seal limit stop; 105—upper water stop seat board; 106—lower water stop seat board; 107—vertically arranging a P-head water sealing device; 108—water seal limit support plate; 109—P head water seal; 110—a rubber pad; 111—grid plate; 112—upstream and downstream rounded rectangular bar structures.

DETAILED DESCRIPTION OF THE DISCLOSURE

The technical solutions in the embodiments of the present disclosure will be clearly and completely described below with reference to the drawings in the embodiments of the present disclosure, and it is obvious that the described embodiments are only a part of the embodiments of the present disclosure, and not all of the embodiments. All other embodiments, which can be derived by a person skilled in the art from the embodiments given herein without making any creative effort, shall fall within the protection scope of the present disclosure.

It should be noted that all the directional indicators (such as up, down, left, right, front, and rear . . . ) in the embodiment of the present disclosure are only used to explain the relative position relationship between the components, the movement situation, etc. in a specific posture (as shown in the drawing), and if the specific posture is changed, the directional indicator is changed accordingly.

It should be noted that the upper gate leaf refers to a gate leaf at the topmost part of the integral water-taking gate or the stoplog type water-taking gate; the lower section gate leaf refers to a section of gate leaf at the bottommost end of the integral water-taking gate or the stoplog type water-taking gate; the middle leaf refers to the leaves except the upper leaf and the lower leaf, which are called middle leaves.

Example 1

FIGS. 1 to 23 show a first embodiment of a high-efficiency and fast stepless stratified water-taking gate device provided by the present disclosure, specifically, a hydraulic flap-type flow channel gate device for stepless stratified water-taking with a lower portion hinged in a rotating manner.

The water-taking gate structure is characterized in that a layered water-taking gate is arranged in a water-taking gate groove 2 of a water inlet 1 of a power station, each section of gate leaf 4 of the layered water-taking gate is composed of a movable gate flap 5 and a flow channel gate 6 supporting the movable gate flap 5, and an integral water-taking gate is formed by connecting internode connecting plates 7 between the gate leaves 4 through pin shafts.

The integral water-taking gate is operated by a gate machine 9 arranged at the top of the water inlet gate well; the movable gate flap 5 is partially opened or fully opened and fully closed through a movable gate flap opening and closing device 10 arranged in the flow channel gate 6 to adjust the water taking depth; the movable gate flap 5 is rotatably hinged with the lower part of the flow channel gate 6 through a pin shaft; an upper hanging point 11 of the movable gate clack opening and closing device 10 is connected with a hanging plate 12 arranged at the top of the flow channel gate 6 through a pin shaft, and a lower hanging point 13 is connected with a lifting lug 14 of the movable gate clack 5 through a pin shaft; the gate leaf 4 consists of a lower gate leaf 15, a middle gate leaf 16 and an upper gate leaf 17; the movable gate clack 5 consists of a movable gate plate 18, a frame-shaped water seal device 19 and an L-shaped P-head water seal device 20; the frame-shaped water seal device 19 is arranged at the downstream side of the movable gate plate 18; the movable gate plate 18 is provided with support bars 21 outside two sides of the frame-shaped water sealing device 19; the flow channel gate 6 is formed by welding an upper cross beam 22, a lower cross beam 23 and box-shaped side columns 24 with right-angled trapezoid left and right closed cross sections to form a steel-structure runner hole 25 with a closed runner surface; the movable gate clack opening and closing device 10 is an electric push rod or a double-acting oil pump and oil cylinder integrated hydraulic machine; a reverse support 26 is arranged on the upstream side of the flow channel gate 6, and a forward support 27 and a lateral support 28 are arranged on the downstream side; the two sides of the downstream of the flow channel gate 6 are provided with side water seal devices 29, the bottom of the downstream side is provided with a bottom water seal device 30, and the top of the downstream side is provided with a bottom water seal supporting seat plate 31; the overflow upstream surface and the water outlet surface of the upper beam 22, the lower beam 23 and the left and right box-type side columns 24 are rounded 32; the upper cross beam 22 is a groove-shaped structural beam formed by welding an upstream side transverse flange plate 33, a downstream side transverse flange plate 34 and a web 35; the lower cross beam 23 is a groove-shaped structural beam formed by welding an upstream side transverse flange plate 33, a downstream side transverse flange plate 34 and a web 35; the box-type side column 24 is formed by welding an upstream side vertical flange plate 36, an outer side web plate 37, an inner side web plate 38 and a downstream side vertical flange plate 39, wherein: the upstream side vertical flange plate 36, the downstream side vertical flange plate 39 and the inner web 38 are welded to form a chute-type structural beam; a supporting vertical beam 40 corresponding to the position of the supporting bar 21 of the movable gate plate 18 is arranged in the box-shaped side column 24; the bottom of the movable gate plate 18 is provided with a rotating hinge plate 42 corresponding to the position of a fixed hinge plate 41 arranged at the lower part of the upstream side of the flow channel gate 6, and the fixed hinge plate 41 is rotationally connected with the rotating hinge plate 42 by a pin shaft; the movable gate plate 18 is provided with a base seat plate 43 which is welded and fixed with the rotary hinge plate 42; a locking plate 44 and a detachable cable limiting sliding barrel 45 are arranged on the side, close to the water taking gate groove 2, of the box-type side column 24; the cable limiting sliding cylinder 45 consists of a cable limiting sliding groove 46 and a cable limiting sliding groove baffle plate 47; a reinforcing plate 48 arranged on an outer web 37 of the box-type side column 24 is provided with an arc notch 49 corresponding to the position of the cable limiting chute 46; the lower part of an outer side web 37 of a box-shaped side column 24 of the lower section gate leaf 15 is provided with a support plate 50, the middle part is provided with an inlet hole 51, and the upper part is provided with a connecting hole 52 of a pin shaft; the lower part and the upper part of an outer side web plate 37 of a box-shaped side column 24 of the middle section gate leaf 16 are both provided with a connecting hole 52 of a pin shaft, and the middle part is provided with an inlet hole 51; the lower part of the outer side web 37 of the box-shaped side column 24 of the upper section gate leaf 17 is provided with a connecting hole 52 of a pin shaft, and the middle part is provided with an inlet hole 51; the lower part of the connecting hole 52 of the pin shaft is provided with an installation operating hole 53; the middle section gate leaf 16 is provided with a lifting lug plate 55 and a positioning device 56 which are matched with the hydraulic grabbing beam 54 at intervals from bottom to top; the upper section gate leaf 17 is provided with a lifting lug plate 55 and a positioning device 56 which are matched with the hydraulic grabbing beam 54; mounting operation holes 53 are formed in the web plates 35 of the upper cross beam 22 and the lower cross beam 23 of the upper gate leaf 17 and the middle gate leaf 16; the web 35 of the upper cross beam 22 of the lower gate leaf 15 is provided with an installation operation hole 53; the side wall 57 of the water inlet 1 is provided with a water stop seat plate 58 corresponding to the L-shaped P-head water seal device 20 in the rotating range of the movable gate flap 5; a frame-shaped water-stopping seat plate 59 corresponding to the frame-shaped water sealing device 19 is arranged at the upstream side of the flow channel gate 6; the cable 60 and the signal wire 61 in the cable limiting sliding cylinder 45 pass through the manhole 51 and the movable gate opening and closing device 10 corresponding to the movable gate 5 after the operating hole 53 is installed from top to bottom layer by layer, and the water temperature monitoring instrument, the water quality monitoring instrument, the camera and other monitoring or observation instruments are arranged in the flow gate 6 and connected with each other; the cable 60 of the movable gate opening and closing device 10 and the signal wires 61 of monitoring instruments such as a water temperature monitoring instrument, a water quality monitoring instrument, a camera and the like are provided with movable joints 62; the cables 60 above the top of the layered water-taking gate are fixed into a bundle by adopting a plastic sleeve 64 with annular cable holes 63; the vertical beam 99 of the movable gate clack 5 is provided with a communication hole 100; the L-shaped P-head water seal device 20 consists of an L-shaped P-head water seal 101 and a water seal pressing plate 102; a water seal limit stop 104 is arranged at the position of the L-shaped P-shaped head water seal 101 of the cross beam 103, close to the side of the hole, of the movable gate flap 5; the water stop seat plate 58 of the side wall 57 of the water inlet 1 is divided into an upper water stop seat plate 105 and a lower water stop seat plate 106; the lower water stop seat plate 106 is arranged with a height slightly larger than the top of the gate and a width larger than the water seal length when the movable gate flap 5 is fully opened; the width of the upper water stop seat plate 105 corresponds to the position of the L-shaped P-head water seal device 20 when the movable gate flap 5 is in a closed state; the locking beam 65 at the top of the water taking gate groove 2 adopts a bridge structure, and the cable 60 and the signal wire 61 penetrate out of the lower span of the locking beam 65; a distribution box 67 of the movable gate clack opening and closing device 10 is arranged on an overhaul platform 66 at the upper part of the water inlet 1 close to the water taking gate groove 2; during the maintenance of the layered water-taking gate, after the integrated water-taking gate is lifted to the locking beam 65 at the top of the gate well to be locked by the gate machine 9 arranged at the top of the gate, the pin shaft and the cable limiting chute baffle plate 47 between the gate leaves 4 are removed, the cable 60 and the signal wire 61 are removed from the cable limiting sliding cylinder 45 and separated from the gate leaves 4 layer by layer, and then the gate leaves 4 are moved to the gate warehouse 68 for maintenance; after the layered water-taking gate is overhauled and maintained, the gate machine 9 arranged through the gate top transports the gate leaf 4 to the locking beam 65 at the top of the water-taking gate groove 2 to be locked, the internode connecting plate 7 is connected into a whole through the pin shaft, the cable 60 and the signal wire 61 are moved into the cable limiting sliding groove 46 and are sealed by the cable limiting sliding groove baffle plate 47, then the gate leaf 4 is lowered layer by layer and the cable 60 and the signal wire 61 are moved into the cable limiting sliding cylinder 45 to finish the assembly of the integral water-taking gate and then fall to the gate sill 69.

Example 2

Figure 24:
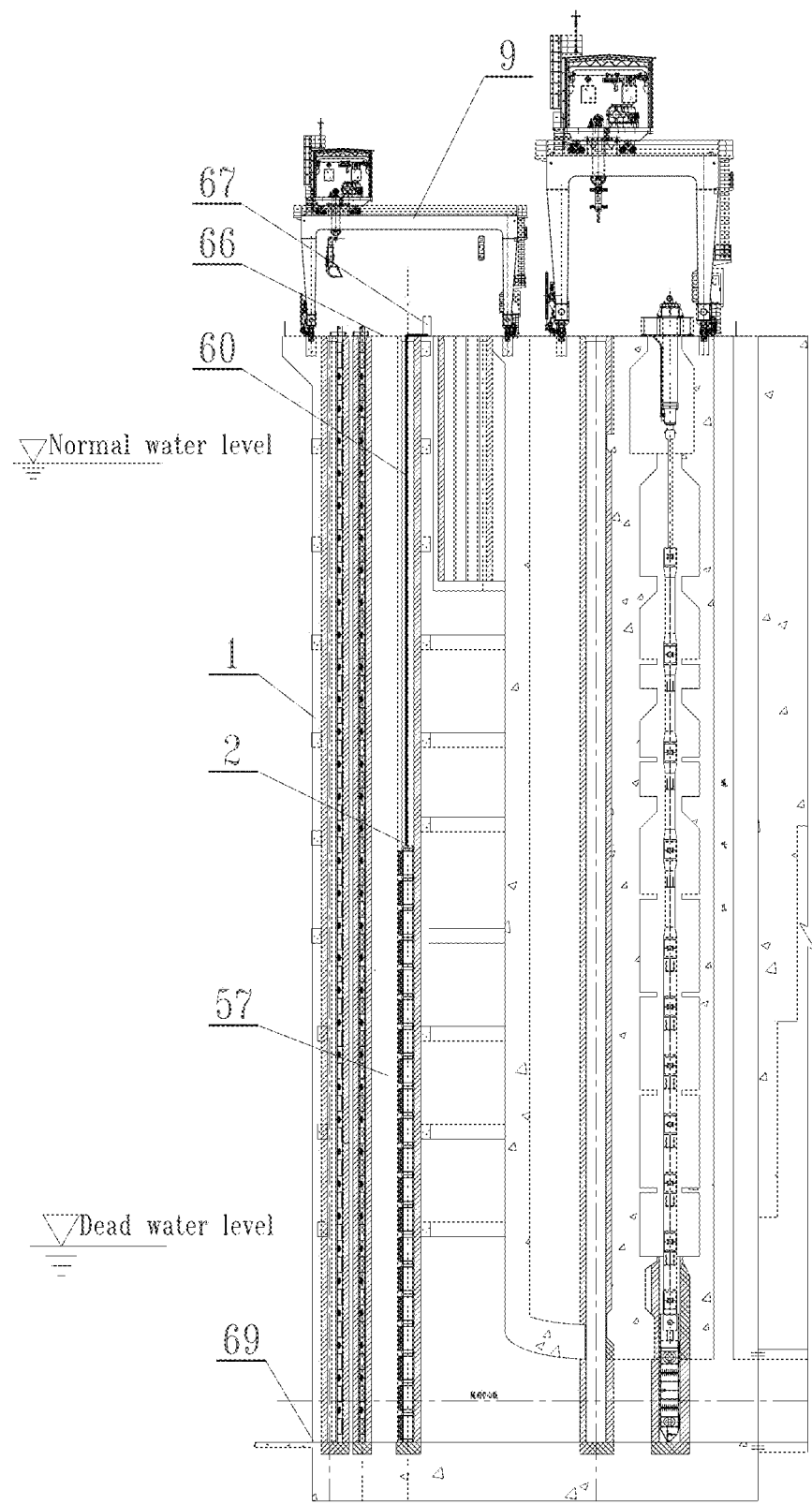
FIG. 24 is a schematic layout of embodiment 2 (upper part rotary hinged stepless layered water-taking hydraulic flap type flow channel gate device) of the present disclosure.
Figure 25:
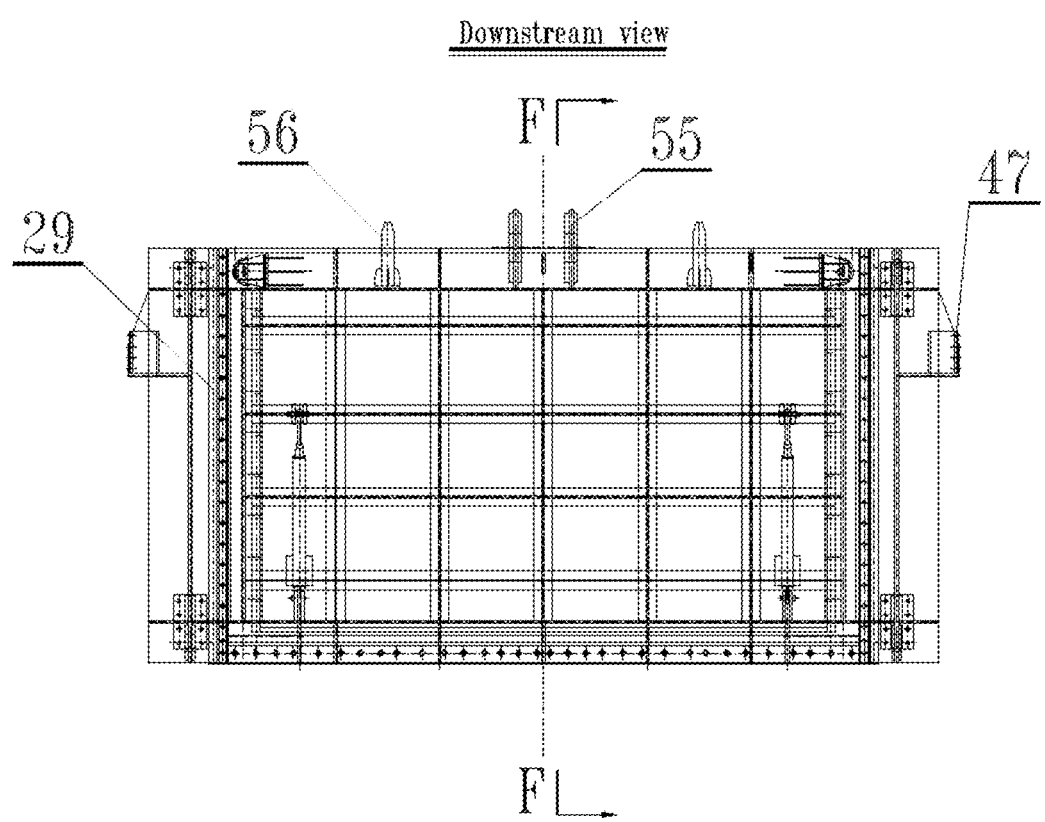
FIG. 25 is a downstream view of a gate leaf in embodiment 2 of the present disclosure.
Figure 26:
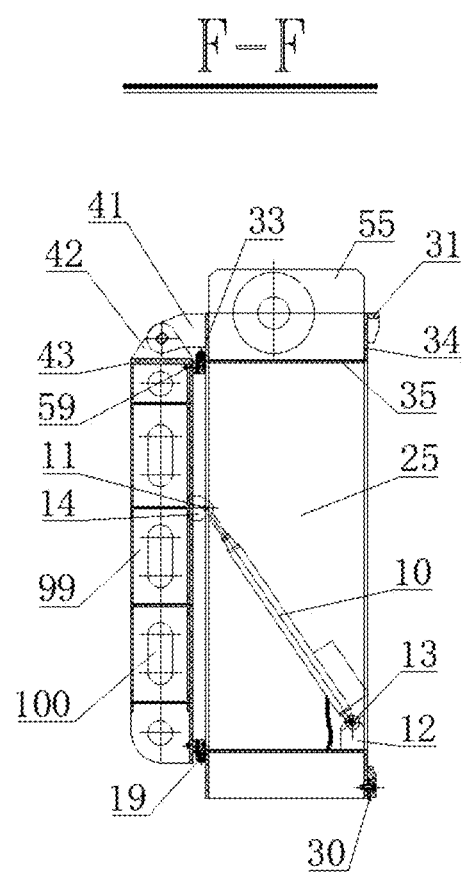
FIG. 26 is a cross-sectional view F-F of FIG. 25.
Figure 27:
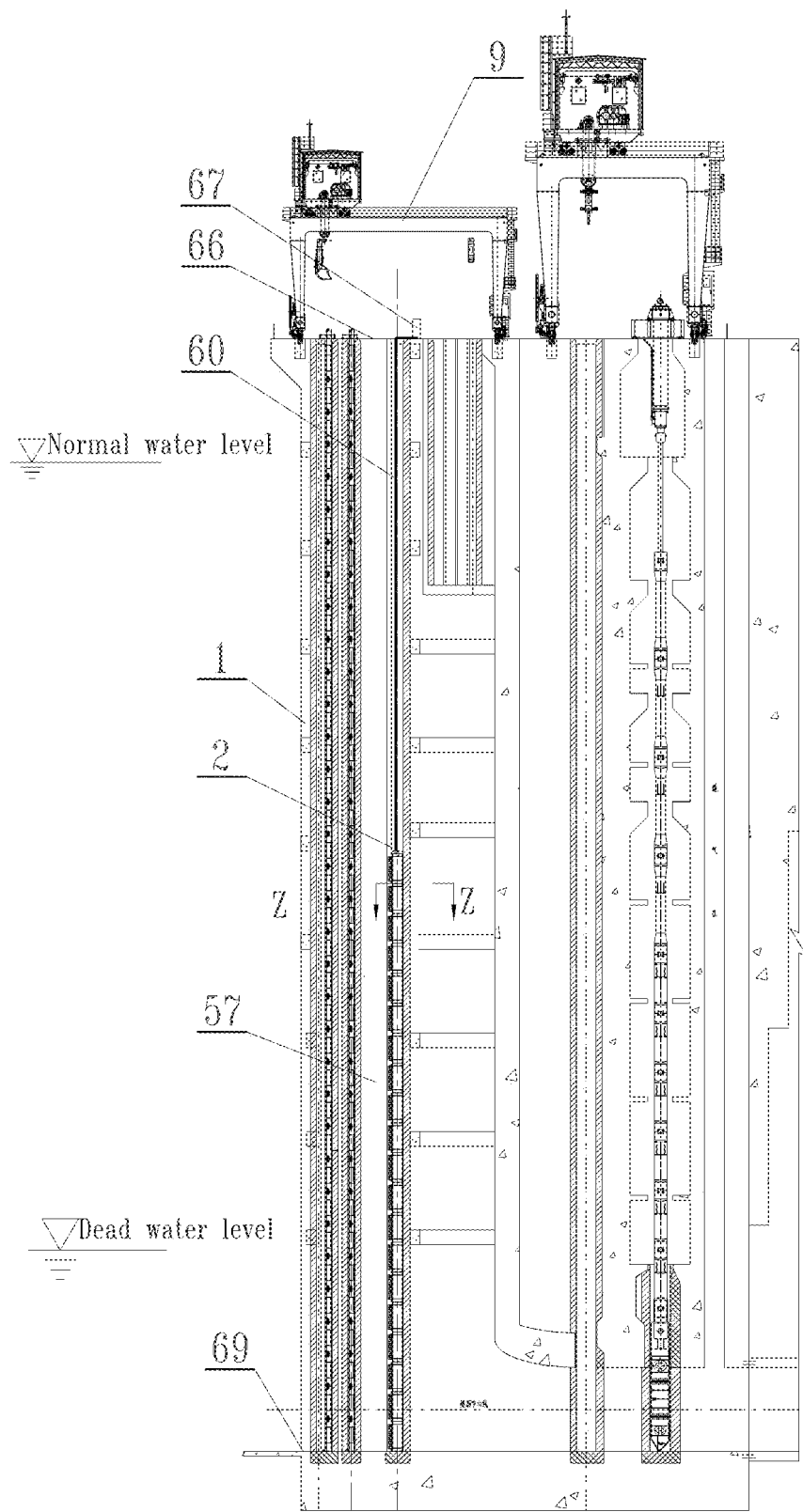
FIG. 27 is a schematic layout of embodiment 3 (side-hinged stepless layered water-taking hydraulic flap gate device) of the present disclosure.
Figure 28:
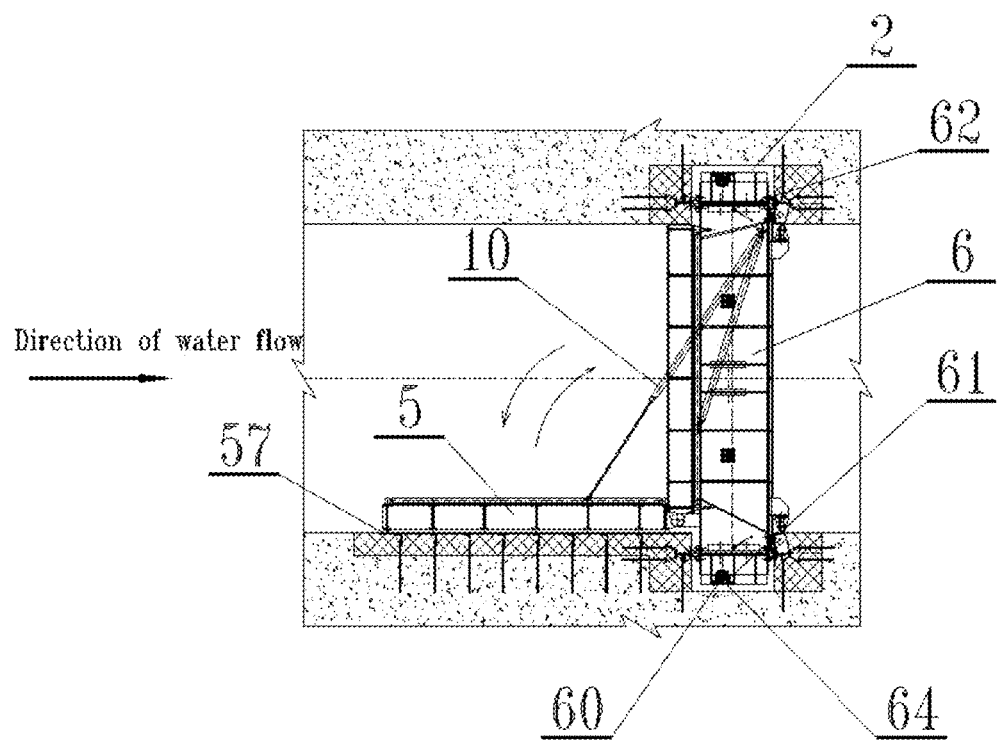
FIG. 28 is a cross-sectional Z-Z view of FIG. 27.
Figure 29:
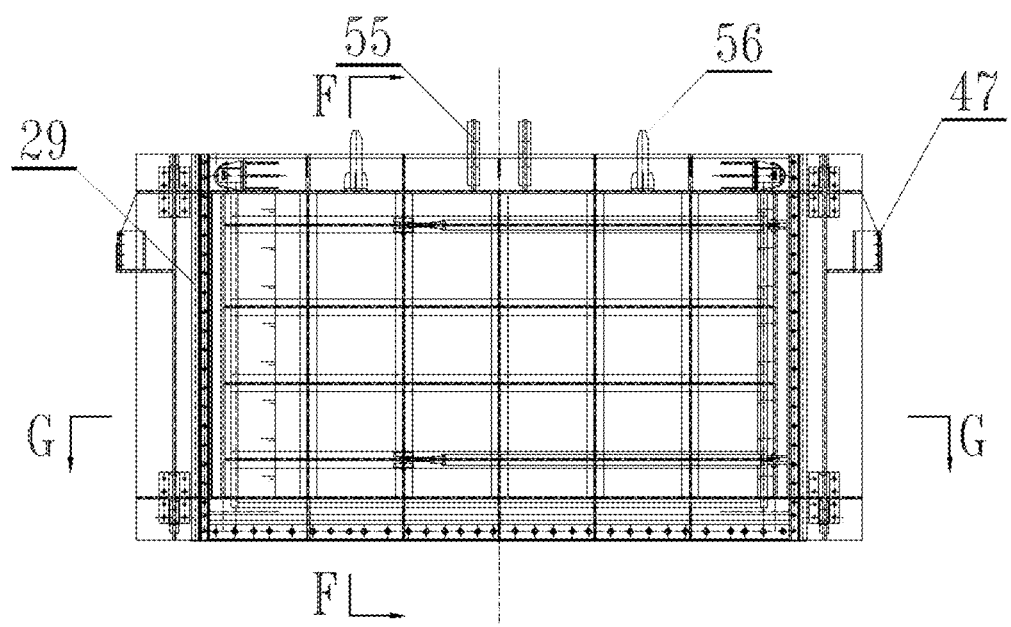
FIG. 29 is a downstream view of a gate leaf in embodiment 3 of the present disclosure.
Figure 30:
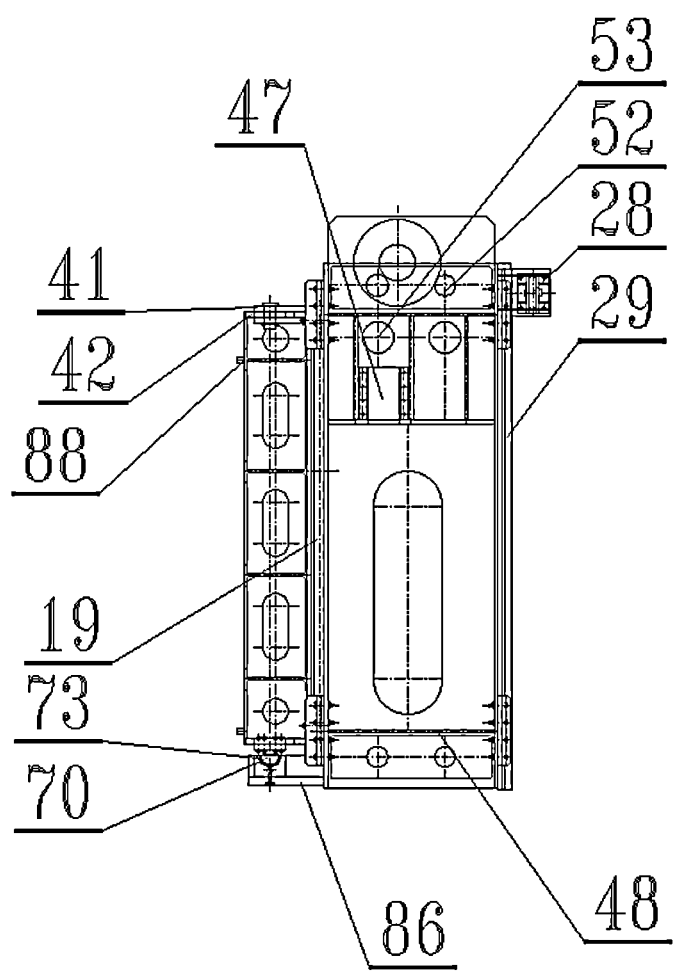
FIG. 30 is a side view of a gate leaf in example 3 of the present disclosure.
Figure 31:
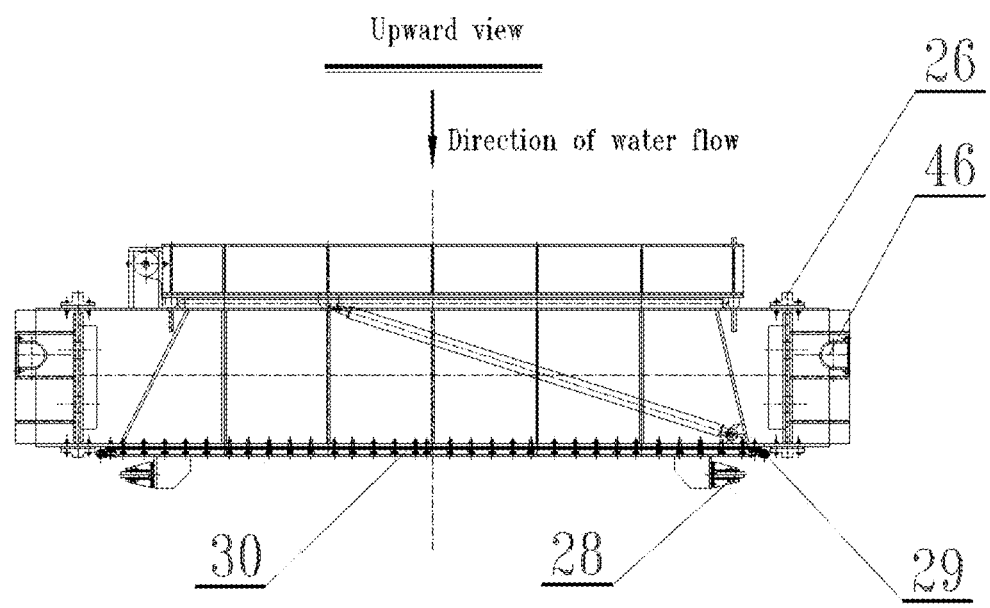
FIG. 31 is a bottom view of a gate leaf in accordance with embodiment 3 of the present disclosure.
Figure 32:
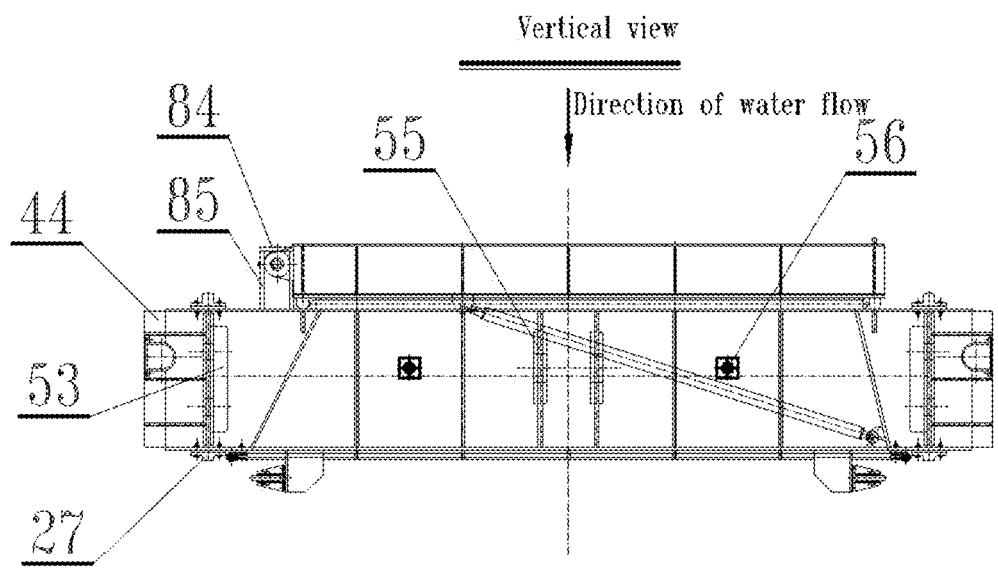
FIG. 32 is a top view of a gate leaf in accordance with example 3 of the present disclosure.
Figure 33:
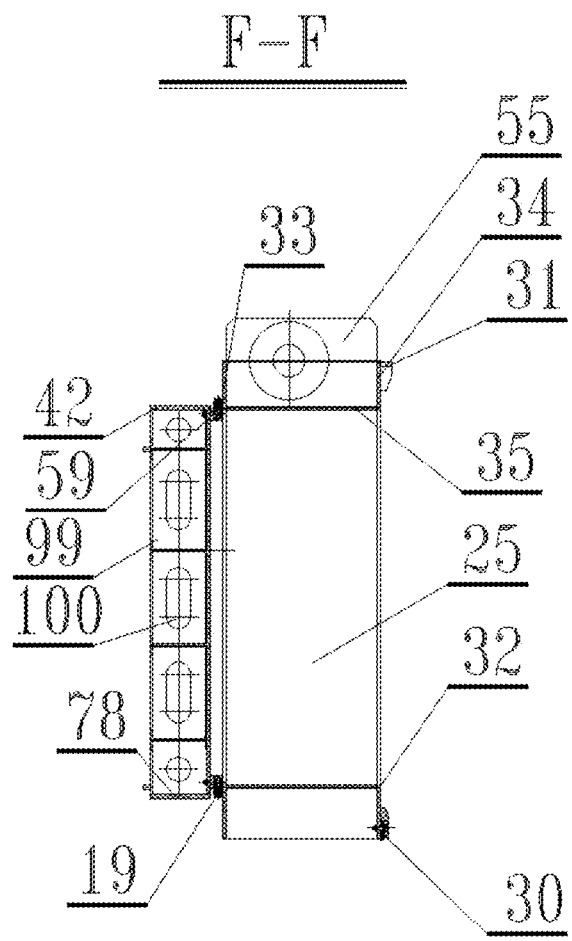
FIG. 33 is a cross-sectional view F-F of FIG. 29.
Figure 34:
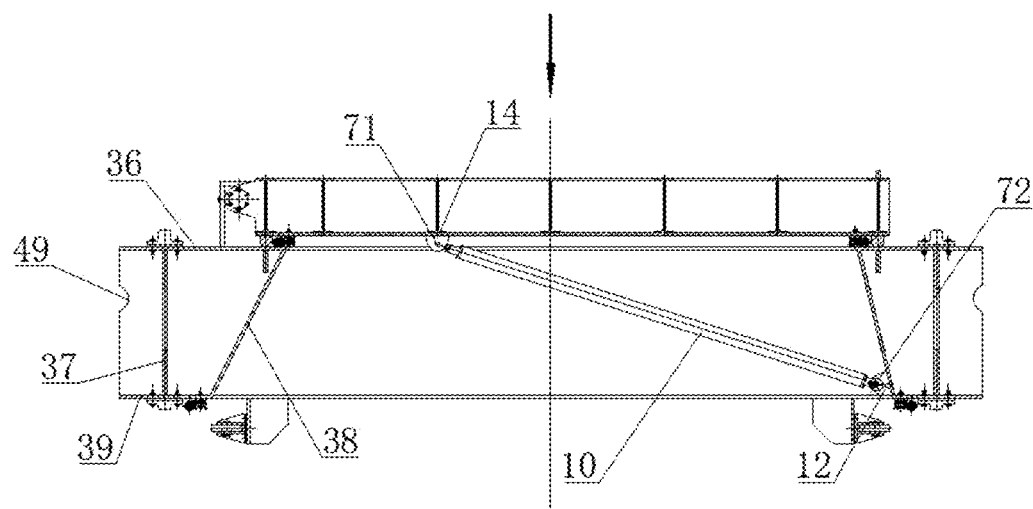
FIG. 34 is a sectional view taken along line G-G of FIG. 29.
Figure 35:
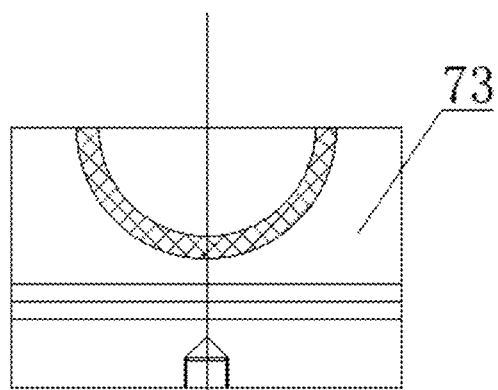
FIG. 35 is a front view of the bottom hinge in embodiment 3 of the present disclosure.
Figure 36:
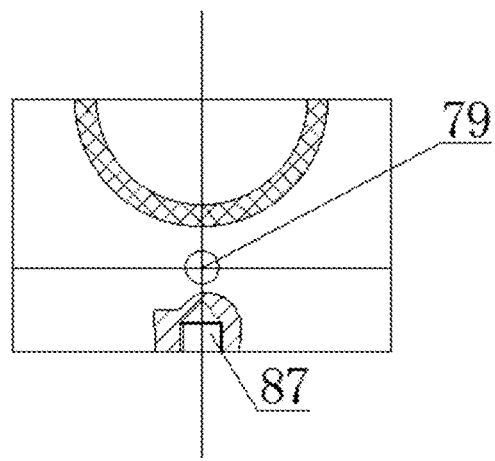
FIG. 36 is a side view of the bottom hinge in embodiment 3 of the present disclosure.
Figure 37:
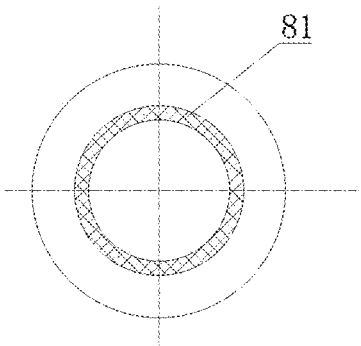
FIG. 37 is a top view of a bottom hinge in accordance with embodiment 3 of the present disclosure.
Figure 38:
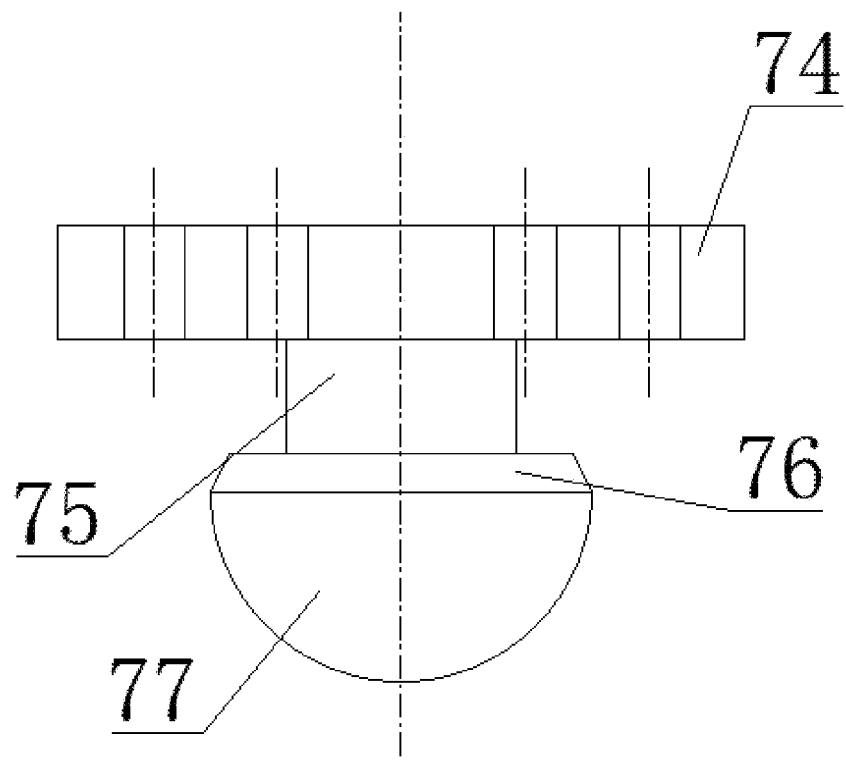
FIG. 38 is a front view of a mushroom stub shaft configuration in accordance with embodiment 3 of the present disclosure.
Figure 39:
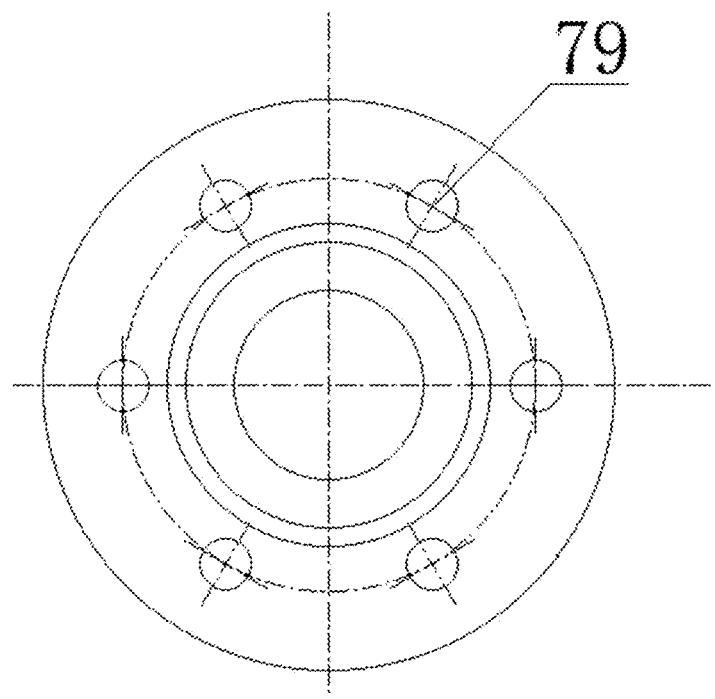
FIG. 39 is a top view of a mushroom stub shaft configuration of example 3 of the present disclosure.
Figure 40:
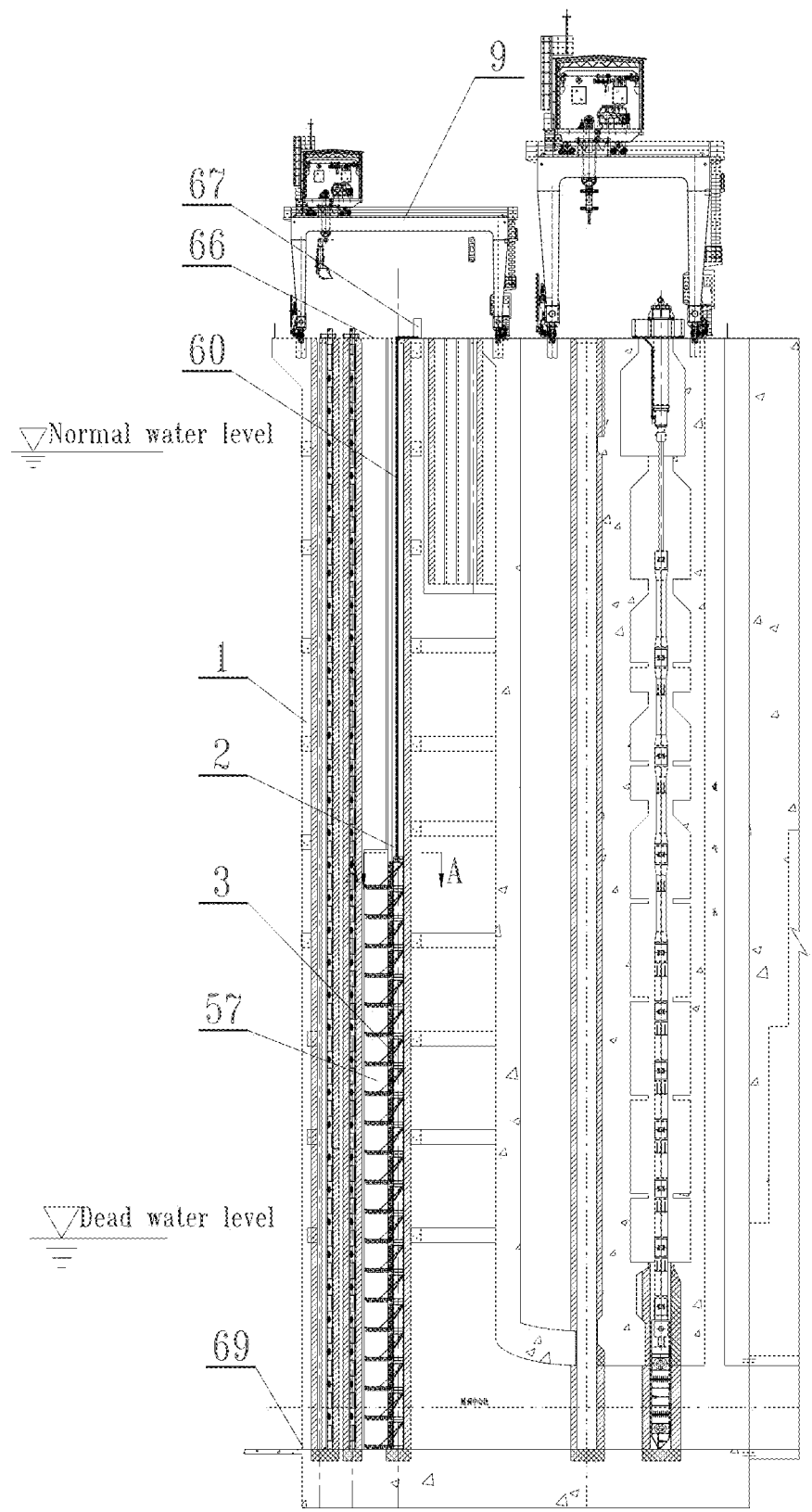
FIG. 40 is a schematic layout of embodiment 4 (gate device of a hydraulic flap type flow path stop log for stepless layered water-taking in which the lower part is hinged)
Figure 41:
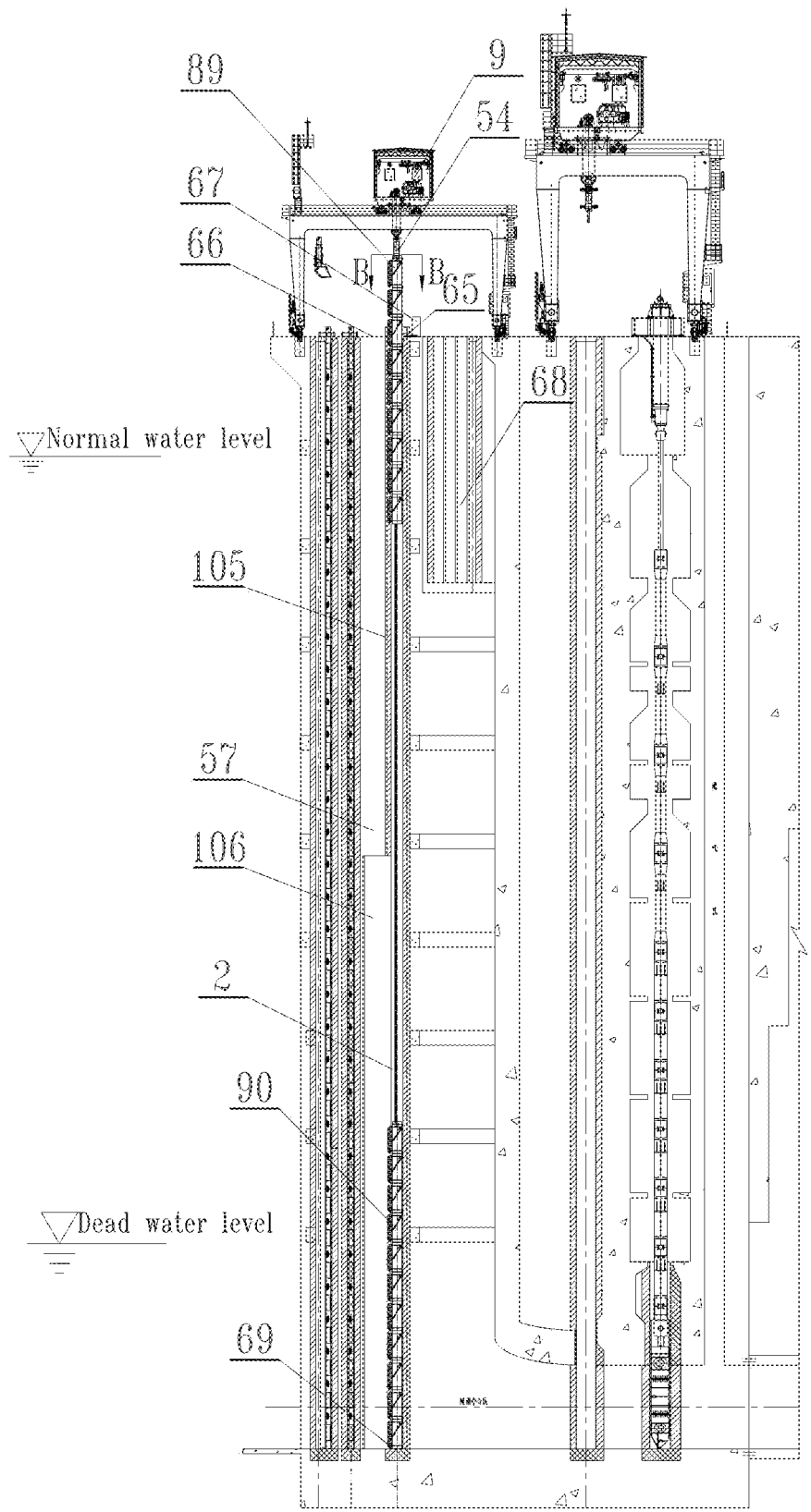
FIG. 41 is a schematic view showing the locking of the top of the gate groove by lifting the cross-member type entry gate in embodiment 4 of the present disclosure.
Figure 42:
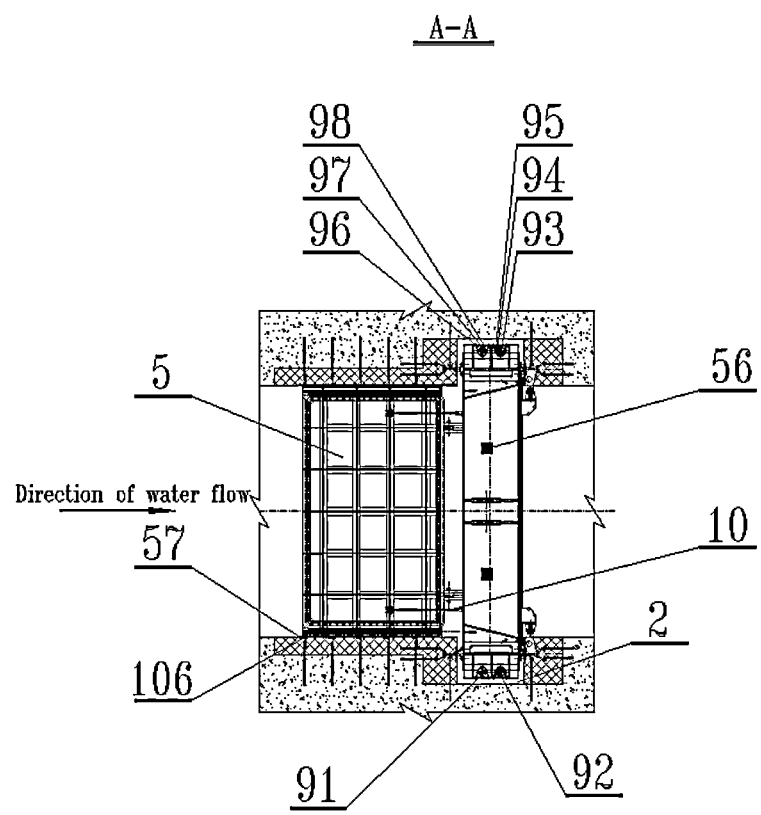
FIG. 42 is a cross-sectional view A-A of FIG. 40.
Figure 43:
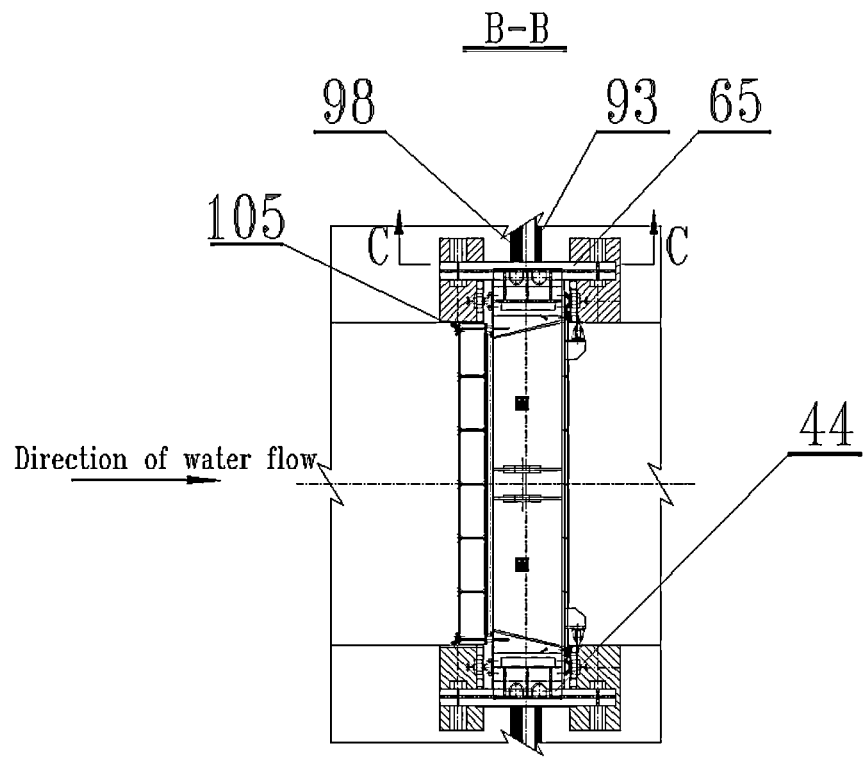
FIG. 43 is a cross-sectional view B-B of FIG. 41.
Figure 44:
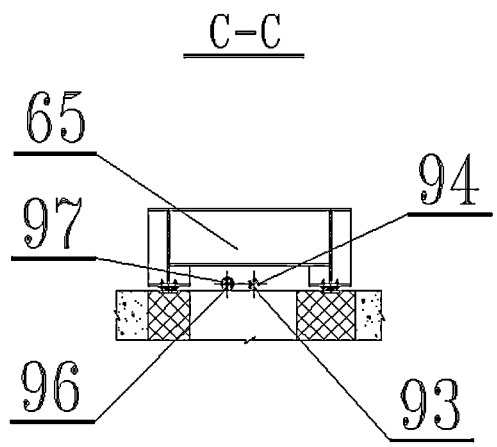
FIG. 44 is a cross-sectional view C-C of FIG. 43.
Figure 45:
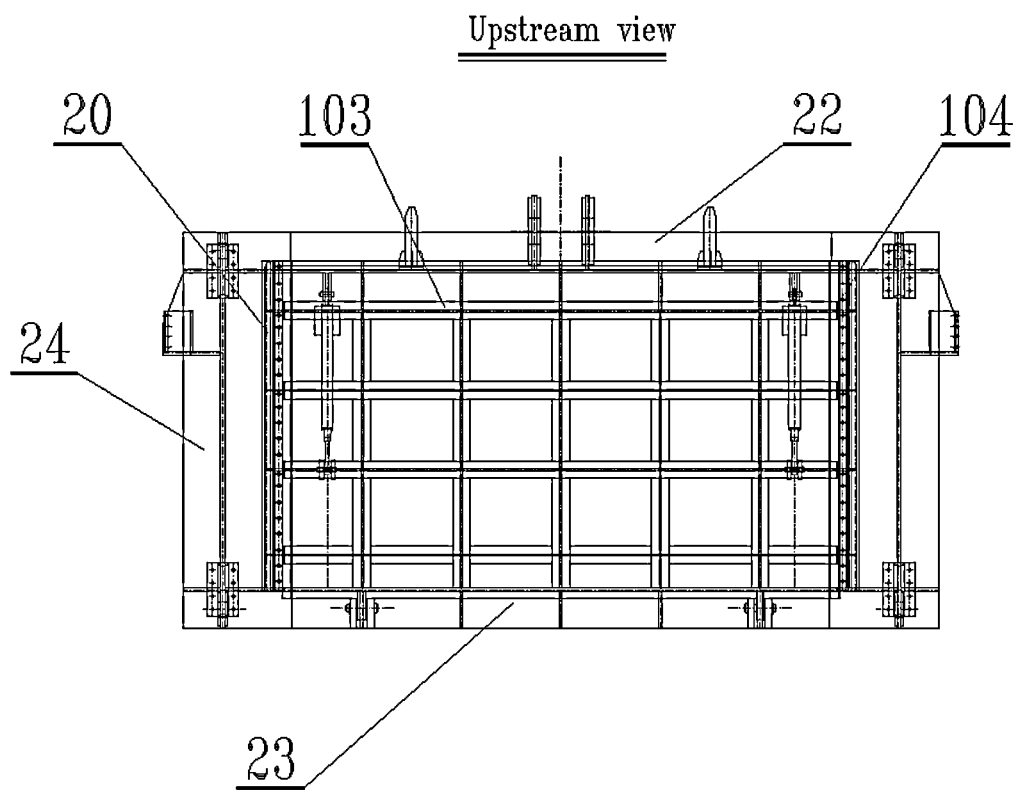
FIG. 45 is an upstream view of a gate leaf in embodiment 4 of the present disclosure.
Figure 46:
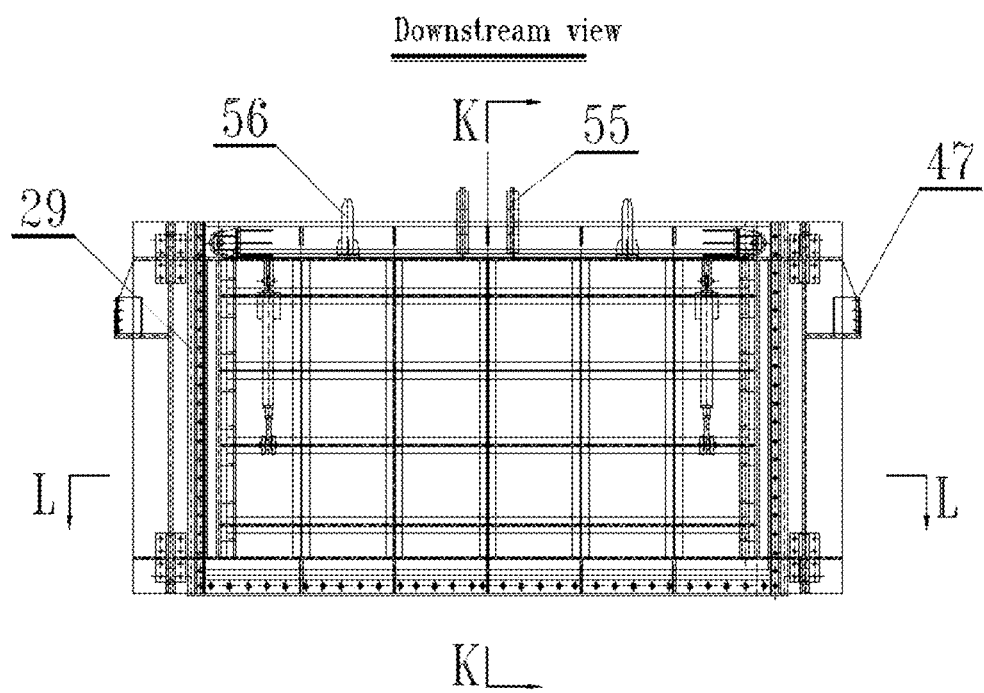
FIG. 46 is a downstream view of a gate leaf in embodiment 4 of the present disclosure.
Figure 47:
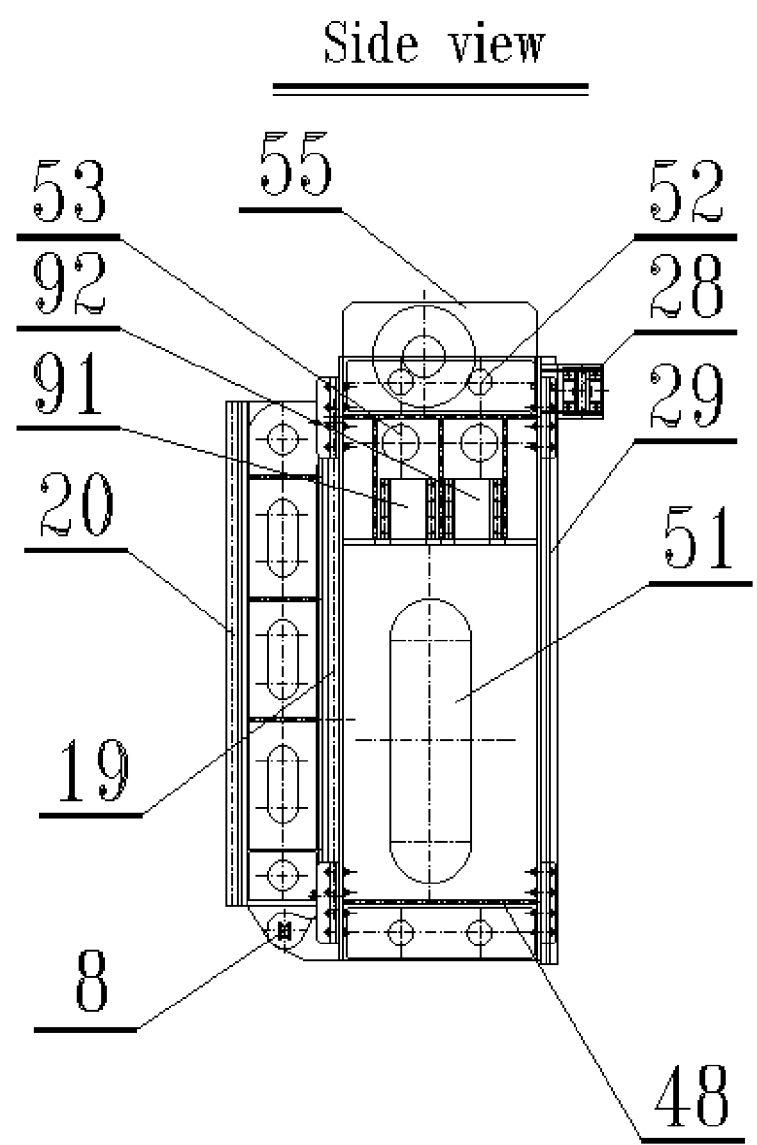
FIG. 47 is a side view of a gate leaf in accordance with example 4 of the present disclosure.
Figure 48:
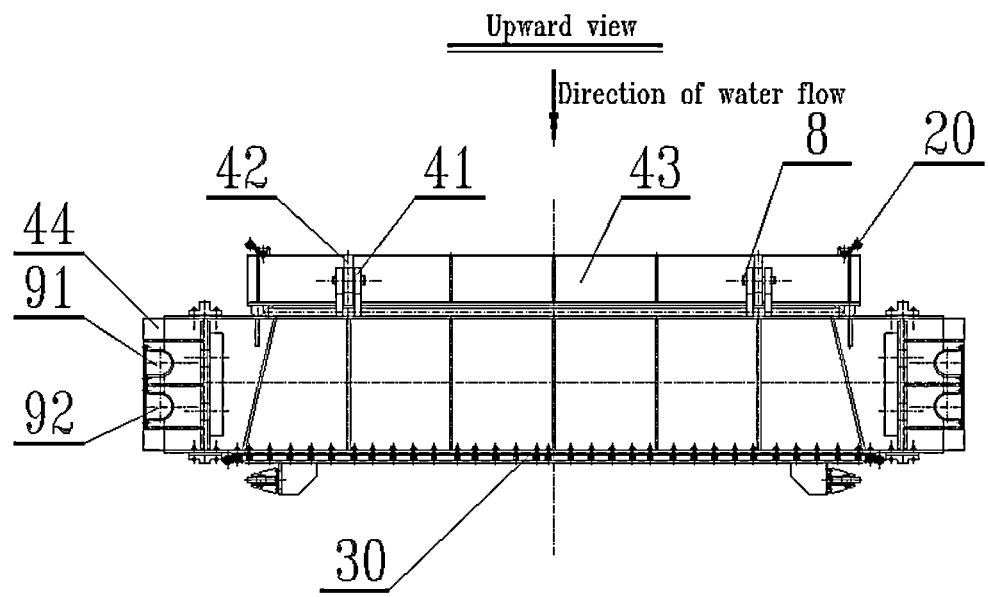
FIG. 48 is a bottom view of the gate leaf in accordance with embodiment 4 of the present disclosure.
Figure 49:
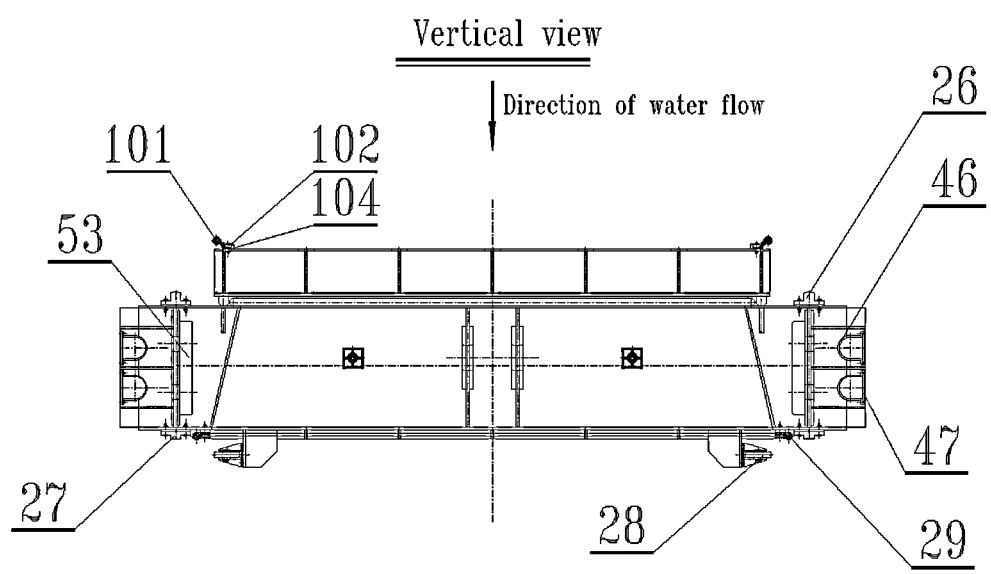
FIG. 49 is a top view of a gate leaf in accordance with example 4 of the present disclosure.
Figure 50:
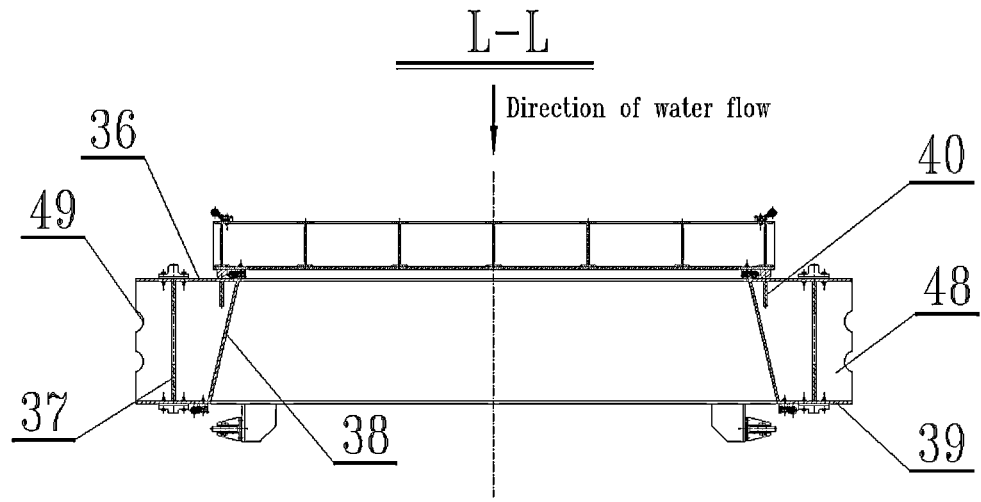
FIG. 50 is a cross-sectional view L-L of FIG. 46.
Figure 51:
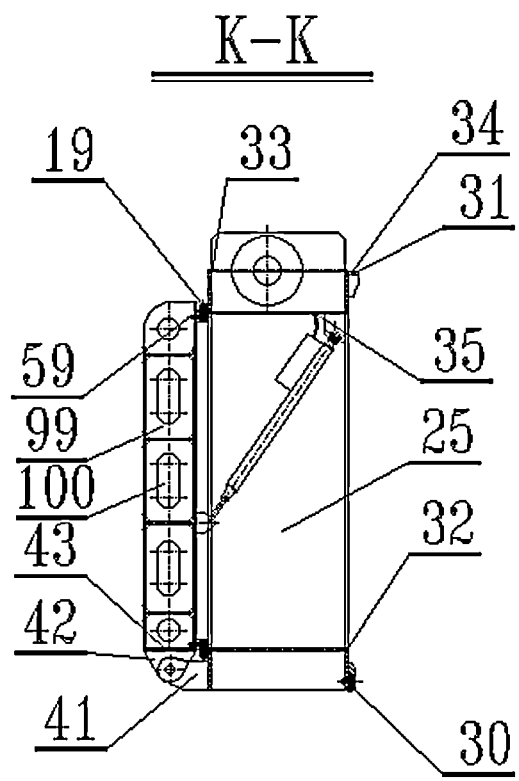
FIG. 51 is a cross-sectional view taken along line K-K of FIG. 46.

Referring to FIG. 24 to FIG. 26, and the structure shown in the drawing of embodiment 1, a second embodiment of a high-efficiency and fast stepless stratified water-taking gate device, specifically, a hydraulic flap-type flow channel gate device for stepless stratified water-taking, whose upper portion is hinged in a rotating manner, is provided.

The water-taking gate structure is characterized in that a layered water-taking gate is arranged in a water-taking gate groove 2 of a water inlet 1 of a power station, each section of gate leaf 4 of the layered water-taking gate is composed of a movable gate flap 5 and a flow channel gate 6 supporting the movable gate flap 5, and an integral water-taking gate is formed by connecting internode connecting plates 7 between the gate leaves 4 through pin shafts.

The integral water-taking gate is operated by a gate machine 9 arranged at the top of the water inlet gate well; the movable gate flap 5 is partially opened or fully opened and fully closed through a movable gate flap opening and closing device 10 arranged in the flow channel gate 6 to adjust the water taking depth; the movable gate flap 5 is rotatably hinged with the upper part of the flow channel gate 6 through a pin shaft; a lower hanging point 13 of the movable gate clack opening and closing device 10 is connected with a hanging plate 12 arranged at the bottom of the flow channel gate 6 through a pin shaft, and an upper hanging point 11 is connected with a lifting lug 14 of the movable gate clack 5 through a pin shaft; the movable gate clack opening and closing device 10 is an electric push rod or a double-acting oil pump and oil cylinder integrated hydraulic machine; the gate leaf 4 consists of a lower gate leaf 15, a middle gate leaf 16 and an upper gate leaf 17; the movable gate clack 5 consists of a movable gate plate 18, a frame-shaped water seal device 19 and an L-shaped P-head water seal device 20; the frame-shaped water seal device 19 is arranged at the downstream side of the movable gate plate 18; the movable gate plate 18 is provided with support bars 21 outside two sides of the frame-shaped water sealing device 19; the flow channel gate 6 is formed by welding an upper cross beam 22, a lower cross beam 23 and box-shaped side columns 24 with right-angled trapezoid left and right closed cross sections to form a steel-structure runner hole 25 with a closed runner surface; a reverse support 26 is arranged on the upstream side of the flow channel gate 6, and a forward support 27 and a lateral support 28 are arranged on the downstream side; the two sides of the downstream of the flow channel gate 6 are provided with side water seal devices 29, the bottom of the downstream side is provided with a bottom water seal device 30, and the top of the downstream side is provided with a bottom water seal supporting seat plate 31; the overflow upstream surface and the water outlet surface of the upper beam 22, the lower beam 23 and the left and right box-type side columns 24 are rounded 32; the upper cross beam 22 is a groove-shaped structural beam formed by welding an upstream side transverse flange plate 33, a downstream side transverse flange plate 34 and a web 35; the lower cross beam 23 is a groove-shaped structural beam formed by welding an upstream side transverse flange plate 33, a downstream side transverse flange plate 34 and a web 35; the box-type side column 24 is formed by welding an upstream side vertical flange plate 36, an outer side web plate 37, an inner side web plate 38 and a downstream side vertical flange plate 39, wherein: the upstream side vertical flange plate 36, the downstream side vertical flange plate 39 and the inner web 38 are welded to form a chute-type structural beam; a supporting vertical beam 40 corresponding to the position of the supporting bar 21 of the movable gate plate 18 is arranged in the box-shaped side column 24; the top of the movable gate plate 18 is provided with a rotary hinge plate 42 corresponding to the position of a fixed hinge plate 41 arranged at the upper part of the upstream side of the flow channel gate 6, and the fixed hinge plate 41 is rotationally connected with the rotary hinge plate 42 by a pin shaft; the movable gate plate 18 is provided with a base seat plate 43 which is welded and fixed with the rotary hinge plate 42; a locking plate 44 and a detachable cable limiting sliding barrel 45 are arranged on the side, close to the water taking gate groove 2, of the box-type side column 24; the cable limiting sliding cylinder 45 consists of a cable limiting sliding groove 46 and a cable limiting sliding groove baffle plate 47; a reinforcing plate 48 arranged on an outer web 37 of the box-type side column 24 is provided with an arc notch 49 corresponding to the position of the cable limiting chute 46; the lower part of an outer side web 37 of a box-shaped side column 24 of the lower section gate leaf 15 is provided with a support plate 50, the middle part is provided with an inlet hole 51, and the upper part is provided with a connecting hole 52 of a pin shaft; the lower part and the upper part of an outer side web plate 37 of a box-shaped side column 24 of the middle section gate leaf 16 are both provided with a connecting hole 52 of a pin shaft, and the middle part is provided with an inlet hole 51; the lower part of the outer side web 37 of the box-shaped side column 24 of the upper section gate leaf 17 is provided with a connecting hole 52 of a pin shaft, and the middle part is provided with an inlet hole 51; the lower part of the connecting hole 52 of the pin shaft is provided with an installation operating hole 53; the middle section gate leaf 16 is provided with a lifting lug plate 55 and a positioning device 56 which are matched with the hydraulic grabbing beam 54 at intervals from bottom to top; the upper section gate leaf 17 is provided with a lifting lug plate 55 and a positioning device 56 which are matched with the hydraulic grabbing beam 54; mounting operation holes 53 are formed in the web plates 35 of the upper cross beam 22 and the lower cross beam 23 of the upper gate leaf 17 and the middle gate leaf 16; the web 35 of the upper cross beam 22 of the lower gate leaf 15 is provided with an installation operation hole 53; the side wall 57 of the water inlet 1 is provided with a water stop seat plate 58 corresponding to the L-shaped P-head water seal device 20 in the rotating range of the movable gate flap 5; a frame-shaped water-stopping seat plate 59 corresponding to the frame-shaped water sealing device 19 is arranged at the upstream side of the flow channel gate 6; the vertical beam 99 of the movable gate clack 5 is provided with a communication hole 100; the L-shaped P-head water seal device 20 consists of an L-shaped P-head water seal 101 and a water seal pressing plate 102; a water seal limit stop 104 is arranged at the position of the L-shaped P-shaped head water seal 101 of the cross beam 103, close to the side of the hole, of the movable gate flap 5; the water stop seat plate 58 of the side wall 57 of the water inlet 1 is divided into an upper water stop seat plate 105 and a lower water stop seat plate 106; the lower water stop seat plate 106 is arranged with a height slightly larger than the top of the gate and a width larger than the water seal length when the movable gate flap 5 is fully opened; the width 105 of the upper water stop seat plate corresponds to the position of the L-shaped P-head water seal device 20 when the movable gate flap 5 is in a closed state; the cable 60 and the signal wire 61 in the cable limiting sliding cylinder 45 pass through the manhole 51 and the movable gate opening and closing device 10 corresponding to the movable gate 5 after the operating hole 53 is installed from top to bottom layer by layer, and the water temperature monitoring instrument, the water quality monitoring instrument, the camera and other monitoring or observation instruments are arranged in the flow gate 6 and connected with each other; the cable 60 of the movable gate opening and closing device 10 and the signal wires 61 of monitoring instruments such as a water temperature monitoring instrument, a water quality monitoring instrument, a camera and the like are provided with movable joints 62; the cables 60 above the top of the layered water-taking gate are fixed into a bundle by adopting a plastic sleeve 64 with annular cable holes 63; the locking beam 65 at the top of the water taking gate groove 2 adopts a bridge structure, and the cable 60 and the signal wire 61 penetrate out of the lower span of the locking beam 65; a distribution box 67 of the movable gate clack opening and closing device 10 is arranged on an overhaul platform 66 at the upper part of the water inlet 1 close to the water taking gate groove 2; when the layered water-taking gate is overhauled and maintained, the gate machine 9 arranged on the top of the gate lifts the integrated water-taking gate to the locking beam 65 at the top of the gate well to be locked, the pin shaft and the cable limiting sliding groove baffle plate 47 between the gate leaves 4 are detached, the cable 60 and the signal wire 61 are removed from the cable limiting sliding cylinder 45 and separated from the gate leaves 4 layer by layer, and then the gate leaves 4 are moved to the gate warehouse 68 to be overhauled and maintained.

After the layered water-taking gate is overhauled and maintained, the gate machine 9 arranged on the top of the gate is used for conveying the gate leaf 4 to the locking beam 65 at the top of the water-taking gate groove 2 to be locked, the internode connecting plate 7 is used for connecting the two adjacent gate leaves 4 into a whole through the pin shaft, the cable 60 and the signal wire 61 are moved into the cable limiting sliding groove 46 and are sealed by the cable limiting sliding groove baffle plate 47, and then the gate leaf 4 is lowered layer by layer and the cable 60 and the signal wire 61 are moved into the cable limiting sliding cylinder 45 to complete the assembly of the integral water-taking gate and then fall to the gate sill 69.

Example 3

Referring to FIGS. 27 to 39, and the structure shown in the drawing of embodiment 1, a third embodiment of the efficient and fast stepless stratified water-taking gate device provided by the present disclosure is specifically a stepless stratified water-taking hydraulic flap gate device with a side surface rotationally hinged.

The water-taking gate structure is characterized in that a layered water-taking gate is arranged in a water-taking gate groove 2 of a water inlet 1 of a power station, each section of gate leaf 4 of the layered water-taking gate is composed of a movable gate flap 5 and a flow channel gate 6 supporting the movable gate flap 5, and an integral water-taking gate is formed by connecting internode connecting plates 7 between the gate leaves 4 through pin shafts.

The integral water-taking gate is operated by a gate machine 9 arranged at the top of the water inlet gate well; the movable gate flap 5 is partially opened or fully opened and fully closed through a movable gate flap opening and closing device 10 arranged in the flow channel gate 6 to adjust the water taking depth; the movable gate flap 5 is rotatably hinged with the side surface of the flow channel gate 6 through a pin shaft and a mushroom shaft head 70; the front hanging point 71 of the movable gate clack opening and closing device 10 is connected with the lifting lug 14 of the movable gate clack 5 through a pin shaft, and the rear hanging point 72 is connected with the hanging plate 12 arranged on the side part of the flow channel gate 6 through a pin shaft; the gate leaf 4 consists of a lower gate leaf 15, a middle gate leaf 16 and an upper gate leaf 17; the movable gate clack 5 consists of a movable gate plate 18, a frame-shaped water seal device 19 and an L-shaped P-head water seal device 20; the frame-shaped water seal device 19 is arranged at the downstream side of the movable gate plate 18; the movable gate plate 18 is provided with support bars 21 outside two sides of the frame-shaped water sealing device 19; the flow channel gate 6 is formed by welding an upper cross beam 22, a lower cross beam 23 and box-shaped side columns 24 with right-angled trapezoid left and right closed cross sections to form a steel-structure runner hole 25 with a closed runner surface; a reverse support 26 is arranged on the upstream side of the flow channel gate 6, and a forward support 27 and a lateral support 28 are arranged on the downstream side; the two sides of the downstream of the flow channel gate 6 are provided with side water seal devices 29, the bottom of the downstream side is provided with a bottom water seal device 30, and the top of the downstream side is provided with a bottom water seal supporting seat plate 31; the overflow upstream surface and the water outlet surface of the upper beam 22, the lower beam 23 and the left and right box-type side columns 24 are rounded 32; the upper cross beam 22 is a groove-shaped structural beam formed by welding an upstream side transverse flange plate 33, a downstream side transverse flange plate 34 and a web 35; the lower cross beam 23 is a groove-shaped structural beam formed by welding an upstream side transverse flange plate 33, a downstream side transverse flange plate 34 and a web 35; the box-type side column 24 is formed by welding an upstream side vertical flange plate 36, an outer side web plate 37, an inner side web plate 38 and a downstream side vertical flange plate 39, wherein: the upstream side vertical flange plate 36, the downstream side vertical flange plate 39 and the inner web 38 are welded to form a chute-type structural beam; a supporting vertical beam 40 corresponding to the position of the supporting bar 21 of the movable gate plate 18 is arranged in the box-shaped side column 24; the upper part of the side surface of the movable gate plate 18 is provided with a rotating hinge plate 42 corresponding to the position of a fixed hinge plate 41 arranged at the upper part of the upstream side of the flow channel gate 6, the fixed hinge plate 41 is rotatably connected with the rotating hinge plate 42 by a pin shaft, the lower part of the side surface of the movable gate plate 18 is provided with a mushroom shaft head 70 corresponding to the position of a bottom pivot 73 arranged at the lower part of the upstream side of the flow channel gate 6, the bottom pivot 73 is rotatably connected with the mushroom shaft head 70, and the pin shaft is the same as the axes between the bottom pivot 73 and the mushroom shaft head 70; the mushroom spindle head 70 consists of a top circular spindle seat section 74, a middle spindle section 75, a truncated cone transition spindle section 76 and a hemisphere section 77; a fixed seat plate 78 corresponding to the position of the top circular shaft seat section 74 is arranged at the lower part of the side surface of the movable gate plate 18, and a screw hole 79 corresponding to the drilling position is annularly arranged; the mushroom shaft head 70 is connected with a fixed seat plate 78 of the movable gate plate 18 into a whole through a bolt 80; the bottom pivot 73 is a circular truncated cone structure provided with a spherical bearing 81 made of a self-lubricating composite material; the bottom pivot 73 is fixed by a bolt 80 and a screw 83 through a gate-shaped groove supporting seat 82 arranged on the box-shaped side column 24; the gate-shaped groove supporting seat 82 is formed by welding an upstream side limiting plate 84, two side limiting plates 85 and a bottom support plate 86; the side surface of the bottom pivot 73 is provided with a screw hole 79 corresponding to the positions of the limit plates 85 at the two sides and is fixed from the side surface through a bolt 80; the bottom supporting plate 86 is provided with a threaded hole 87 corresponding to the position of the bottom pivot 73 and is fixed from the bottom through a screw 83; the downstream side of the movable gate plate 18 is provided with a collision head 88; a locking plate 44 and a detachable cable limiting sliding barrel 45 are arranged on the side, close to the water taking gate groove 2, of the box-type side column 24; the cable limiting sliding cylinder 45 consists of a cable limiting sliding groove 46 and a cable limiting sliding groove baffle plate 47; a reinforcing plate 48 arranged on an outer web 37 of the box-type side column 24 is provided with an arc notch 49 corresponding to the position of the cable limiting chute 46; the lower part of an outer side web 37 of a box-shaped side column 24 of the lower section gate leaf 15 is provided with a support plate 50, the middle part is provided with an inlet hole 51, and the upper part is provided with a connecting hole 52 of a pin shaft; the lower part and the upper part of an outer side web plate 37 of a box-shaped side column 24 of the middle section gate leaf 16 are both provided with a connecting hole 52 of a pin shaft, and the middle part is provided with an inlet hole 51; the lower part of the outer side web 37 of the box-shaped side column 24 of the upper section gate leaf 17 is provided with a connecting hole 52 of a pin shaft, and the middle part is provided with an inlet hole 51; the lower part of the connecting hole 52 of the pin shaft is provided with an installation operating hole 53; the middle section gate leaf 16 is provided with a lifting lug plate 55 and a positioning device 56 which are matched with the hydraulic grabbing beam 54 at intervals from bottom to top; the upper section gate leaf 17 is provided with a lifting lug plate 55 and a positioning device 56 which are matched with the hydraulic grabbing beam 54; mounting operation holes 53 are formed in the web plates 35 of the upper cross beam 22 and the lower cross beam 23 of the upper gate leaf 17 and the middle gate leaf 16; the web 35 of the upper cross beam 22 of the lower gate leaf 15 is provided with an installation operation hole 53; the side wall 57 of the water inlet 1 is provided with a water stop seat plate 58 corresponding to the L-shaped P-head water seal device 20 in the rotating range of the movable gate flap 5; a frame-shaped water-stopping seat plate 59 corresponding to the frame-shaped water sealing device 19 is arranged at the upstream side of the flow channel gate 6; the vertical beam 99 of the movable gate clack 5 is provided with a communication hole 100; the cable 60 and the signal wire 61 in the cable limiting sliding cylinder 45 pass through the manhole 51 and the movable gate opening and closing device 10 corresponding to the movable gate 5 after the operating hole 53 is installed from top to bottom layer by layer, and the water temperature monitoring instrument, the water quality monitoring instrument, the camera and other monitoring or observation instruments are arranged in the flow gate 6 and connected with each other; the cable 60 of the movable gate opening and closing device 10 and the signal wires 61 of monitoring instruments such as a water temperature monitoring instrument, a water quality monitoring instrument, a camera and the like are provided with movable joints 62; the cables 60 above the top of the layered water-taking gate are fixed into a bundle by adopting a plastic sleeve 64 with annular cable holes 63; the locking beam 65 at the top of the water taking gate groove 2 adopts a bridge structure, and the cable 60 and the signal wire 61 penetrate out of the lower span of the locking beam 65; a distribution box 67 of the movable gate clack opening and closing device 10 is arranged on an overhaul platform 66 at the upper part of the water inlet 1 close to the water taking gate groove 2; when the layered water-taking gate is overhauled and maintained, the gate machine 9 arranged on the top of the gate lifts the integrated water-taking gate to the locking beam 65 at the top of the gate well to be locked, the pin shaft and the cable limiting sliding groove baffle plate 47 between the gate leaves 4 are detached, the cable 60 and the signal wire 61 are removed from the cable limiting sliding cylinder 45 and separated from the gate leaves 4 layer by layer, and then the gate leaves 4 are moved to the gate warehouse 68 to be overhauled and maintained.

After the layered water-taking gate is overhauled and maintained, the gate machine 9 arranged through the gate top transports the gate leaf 4 to the locking beam 65 at the top of the water-taking gate groove 2 to be locked, the internode connecting plate 7 is connected into a whole through the pin shaft, the cable 60 and the signal wire 61 are moved into the cable limiting sliding groove 46 and are sealed by the cable limiting sliding groove baffle plate 47, then the gate leaf 4 is lowered layer by layer and the cable 60 and the signal wire 61 are moved into the cable limiting sliding cylinder 45 to finish the assembly of the integral water-taking gate and then fall to the gate sill 69.

Example 4

Referring to FIGS. 40 to 51, and the accompanying drawing in embodiment 1, a fourth embodiment of a high-efficiency and fast stepless stratified water-taking gate device, specifically, a hydraulic flap-type flow channel laminated beam gate device for stepless stratified water-taking, the lower part of which is rotatably hinged, is provided by the present disclosure.

Set up layering water-taking gate in the water-taking gate groove 2 of power station water inlet 1, every section gate leaf 4 of layering water-taking gate comprises dodge gate lamella 5 and the flow channel gate 6 that supports dodge gate lamella 5, adopts internode connecting plate 7 to connect into upper folding beam water-taking gate 89 and lower folding beam water-taking gate 90 respectively through the round pin axle between the gate leaf 4. The upper stoplog water-taking gate 89 and the lower stoplog water-taking gate 90 are operated by a gate machine 9 arranged at the top of the water inlet gate well; the movable gate flap 5 is partially opened or fully opened and fully closed through a movable gate flap opening and closing device 10 arranged in the flow channel gate 6 to adjust the water taking depth; the movable gate flap 5 is rotatably hinged with the lower part of the flow channel gate 6 through a pin shaft; an upper hanging point 11 of the movable gate clack opening and closing device 10 is connected with a hanging plate 12 arranged at the top of the flow channel gate 6 through a pin shaft, and a lower hanging point 13 is connected with a lifting lug 14 of the movable gate clack 5 through a pin shaft; the gate leaf 4 consists of a lower gate leaf 15, a middle gate leaf 16 and an upper gate leaf 17; the movable gate clack 5 consists of a movable gate plate 18, a frame-shaped water seal device 19 and an L-shaped P-head water seal device 20; the frame-shaped water seal device 19 is arranged at the downstream side of the movable gate plate 18; the movable gate plate 18 is provided with support bars 21 outside two sides of the frame-shaped water sealing device 19; the flow channel gate 6 is formed by welding an upper cross beam 22, a lower cross beam 23 and box-shaped side columns 24 with right-angled trapezoid left and right closed cross sections to form a steel-structure runner hole 25 with a closed runner surface; a reverse support 26 is arranged on the upstream side of the flow channel gate 6, and a forward support 27 and a lateral support 28 are arranged on the downstream side; the two sides of the downstream of the flow channel gate 6 are provided with side water seal devices 29, the bottom of the downstream side is provided with a bottom water seal device 30, and the top of the downstream side is provided with a bottom water seal supporting seat plate 31; the overflow upstream surface and the water outlet surface of the upper beam 22, the lower beam 23 and the left and right box-type side columns 24 are rounded 32; the upper cross beam 22 is a groove-shaped structural beam formed by welding an upstream side transverse flange plate 33, a downstream side transverse flange plate 34 and a web 35; the lower cross beam 23 is a groove-shaped structural beam formed by welding an upstream side transverse flange plate 33, a downstream side transverse flange plate 34 and a web 35; the box-type side column 24 is formed by welding an upstream side vertical flange plate 36, an outer side web plate 37, an inner side web plate 38 and a downstream side vertical flange plate 39, wherein: the upstream side vertical flange plate 36, the downstream side vertical flange plate 39 and the inner web 38 are welded to form a chute-type structural beam; a supporting vertical beam 40 corresponding to the position of the supporting bar 21 of the movable gate plate 18 is arranged in the box-shaped side column 24; the bottom of the movable gate plate 18 is provided with a rotating hinge plate 42 corresponding to the position of a fixed hinge plate 41 arranged at the lower part of the upstream side of the flow channel gate 6, and the fixed hinge plate 41 is rotationally connected with the rotating hinge plate 42 by a pin shaft; the movable gate plate 18 is provided with a base seat plate 43 which is welded and fixed with the rotary hinge plate 42; a locking plate 44 and a detachable cable limiting sliding barrel 45 are arranged on the side, close to the water taking gate groove 2, of the box-type side column 24; the cable limiting sliding barrel 45 consists of an upstream side cable limiting sliding barrel 91 and a downstream side cable limiting sliding barrel 92; the cable limiting sliding cylinder 45 consists of a cable limiting sliding groove 46 and a cable limiting sliding groove baffle plate 47; a reinforcing plate 48 arranged on an outer web 37 of the box-type side column 24 is provided with an arc notch 49 corresponding to the position of the cable limiting chute 46; the lower part of an outer side web 37 of a box-shaped side column 24 of the lower section gate leaf 15 is provided with a support plate 50, the middle part is provided with an inlet hole 51, and the upper part is provided with a connecting hole 52 of a pin shaft; the lower part and the upper part of an outer side web plate 37 of a box-shaped side column 24 of the middle section gate leaf 16 are both provided with a connecting hole 52 of a pin shaft, and the middle part is provided with an inlet hole 51; the lower part of an outer side web 37 of the box-shaped side column 24 of the upper section gate leaf 17 is provided with a connecting hole 52 of a pin shaft, the middle part is provided with an inlet hole 51, and the upper part is provided with a supporting plate 50; the lower part of the connecting hole 52 of the pin shaft is provided with an installation operating hole 53; the middle section gate leaf 16 is provided with a lifting lug plate 55 and a positioning device 56 which are matched with the hydraulic grabbing beam 54 at intervals from bottom to top; the upper section gate leaf 17 is provided with a lifting lug plate 55 and a positioning device 56 which are matched with the hydraulic grabbing beam 54; mounting operation holes 53 are formed in the web plates 35 of the upper cross beam 22 and the lower cross beam 23 of the upper gate leaf 17 and the middle gate leaf 16; the web 35 of the upper cross beam 22 of the lower gate leaf 15 is provided with an installation operation hole 53; the side wall 57 of the water inlet 1 is provided with a water stop seat plate 58 corresponding to the L-shaped P-head water seal device 20 in the rotating range of the movable gate flap 5; a frame-shaped water-stopping seat plate 59 corresponding to the frame-shaped water sealing device 19 is arranged at the upstream side of the flow channel gate 6; the vertical beam 99 of the movable gate clack 5 is provided with a communication hole 100; the cable 93 of the upper beam-superposed water-taking gate and the signal line 94 of the upper beam-superposed water-taking gate are fixed into a bundle by adopting a plastic sleeve 95 of the upper beam-superposed water-taking gate, and the bundle passes through the manhole 51, the movable gate flap opening and closing device 10 corresponding to the movable gate flap 5 after the operation hole 53 is installed and the downstream side cable limiting slide cylinder 92 from top to bottom layer by layer, and the monitoring or observation instruments such as a water temperature monitoring instrument, a water quality monitoring instrument, a camera and the like are arranged inside the flow gate 6 to be connected.

The cable 96 and the signal line 97 of the lower stoplog water-taking gate are fixed into a bundle by adopting a plastic sleeve 98 of the lower stoplog water-taking gate, and the bundle extends from the cable limiting slide cylinder 91 at the upstream side of the upper stoplog water-taking gate 89 to the top of the cable limiting slide cylinder, and then passes through the inlet hole 51, the movable gate flap opening and closing device 10 corresponding to the movable gate flap 5 after the operation hole 53 is installed, and monitoring or observation instruments such as a water temperature monitoring instrument, a water quality monitoring instrument, a camera and the like are arranged inside the flow gate 6 to be connected.

The cable 60 of the movable gate opening and closing device 10 and the signal wires 61 of monitoring instruments such as a water temperature monitoring instrument, a water quality monitoring instrument, a camera and the like are provided with movable joints 62; the locking beam 65 at the top of the water taking gate groove 2 adopts a bridge structure, and the cable 60 and the signal wire 61 penetrate out of the lower span of the locking beam 65; a distribution box 67 of the movable gate clack opening and closing device 10 is arranged on an overhaul platform 66 at the upper part of the water inlet 1 close to the water taking gate groove 2; when the upper stoplog water taking gate 89 is overhauled and maintained, after the gate machine 9 arranged on the top of the gate lifts the upper stoplog water taking gate 89 to the locking beam 65 on the top of the gate well to be locked, the pin shaft and the cable limiting sliding groove baffle 47 between the gate leaves 4 are detached, the upper stoplog water taking gate cable 93 and the upper stoplog water taking gate signal wire 94 are removed by layers to remove the downstream side cable limiting sliding cylinder 92, the lower stoplog water taking gate cable 96 and the lower stoplog water taking gate signal wire 97 are removed to remove the upstream side cable limiting sliding cylinder 91 to be separated from the gate leaves 4, and the gate leaves 4 are moved to the gate warehouse 68 to be overhauled and maintained.

When the lower stoplog water-taking gate 90 is overhauled and maintained, after the upper stoplog water-taking gate 89 is removed firstly, the gate machine 9 arranged on the top of the gate lifts the lower stoplog water-taking gate 90 to the locking beam 65 at the top of the gate well to be locked, the pin shaft and the cable limiting sliding groove baffle 47 between the gate leaves 4 are detached, the lower stoplog water-taking gate cable 96 and the lower stoplog water-taking gate signal wire 97 are removed from the upstream side cable limiting sliding cylinder 91 to be separated from the gate leaves 4 layer by layer, and the gate leaves 4 are moved to the gate storehouse 68 to be overhauled and maintained.

Figure 52:
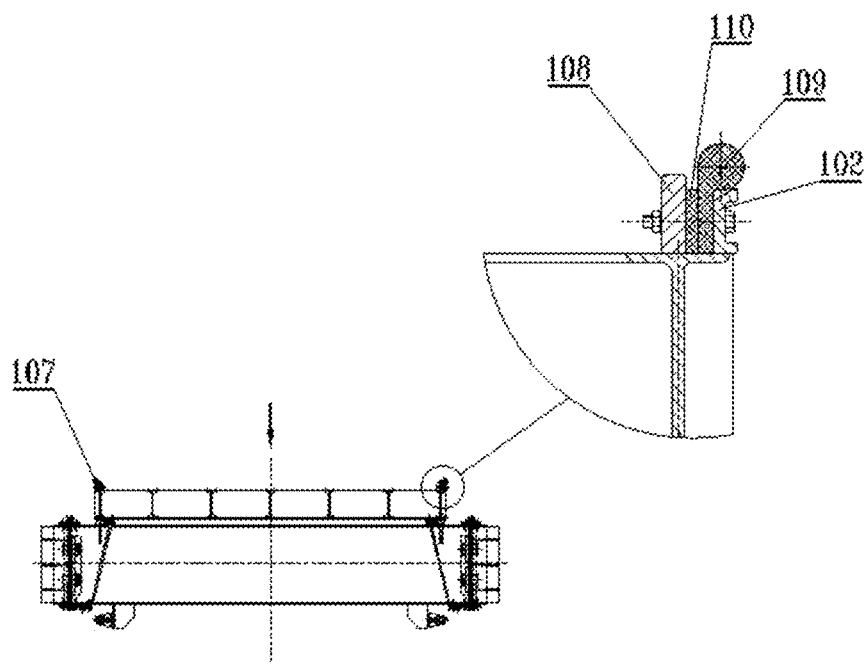
FIG. 52 is a schematic view of a vertically arranged P-head water sealing device arranged upstream of the movable flap in the embodiments 1, 2 and 4 of the disclosure.
Figure 53:
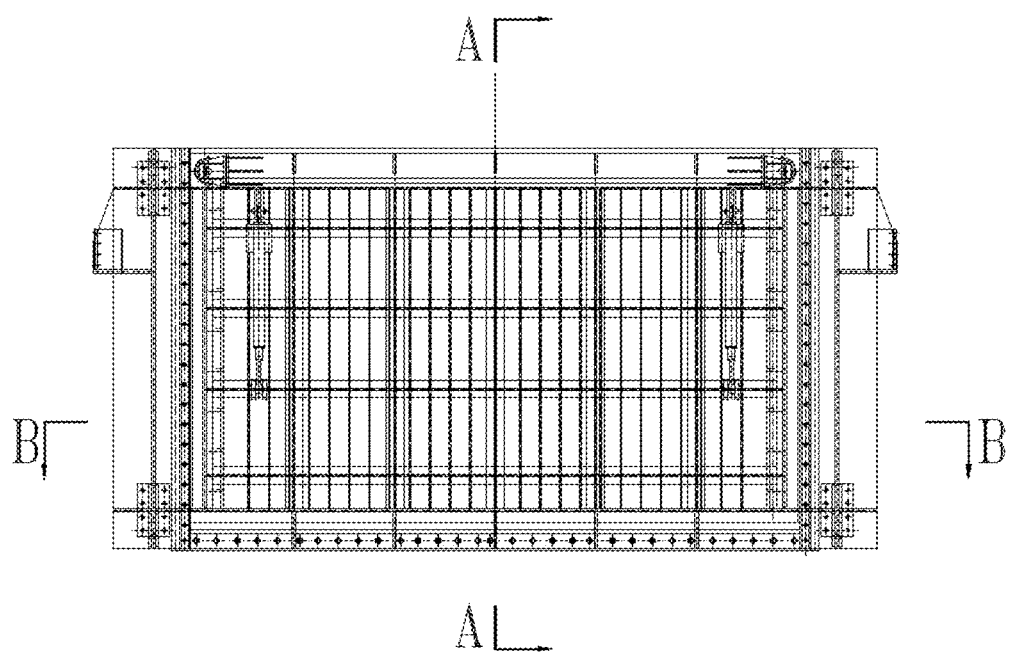
FIG. 53 is a schematic view of a water-taking and trash holding technique using a grating plate provided on a gate leaf in embodiments 1 and 4 of the present disclosure.
Figure 54:
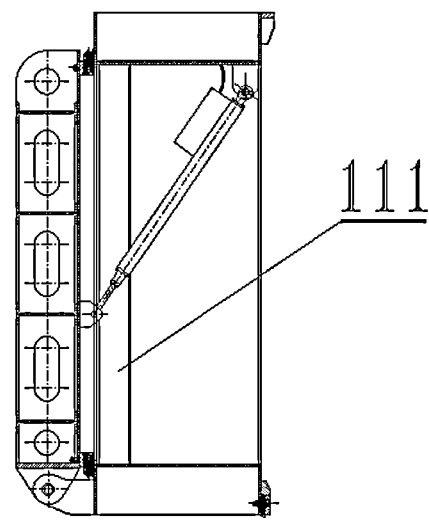
FIG. 54 is a sectional view A-A of FIG. 53.
Figure 55:
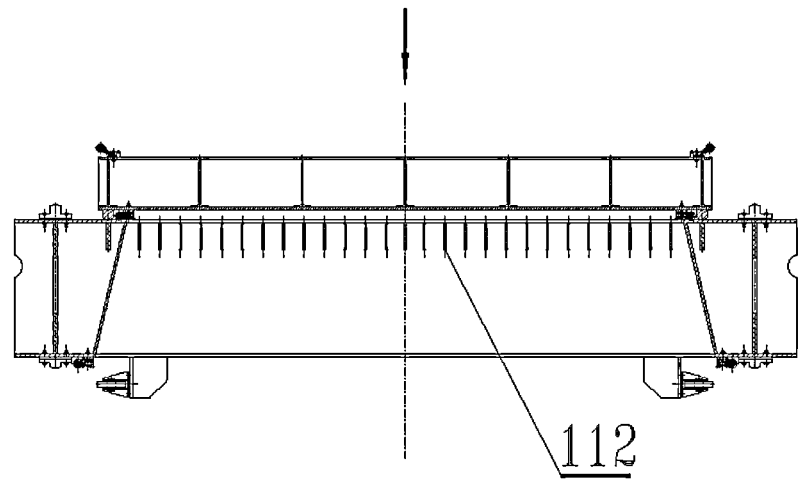
FIG. 55 is a cross-sectional view B-B of FIG. 53.

After the lower stoplog water-taking gate 90 is overhauled and maintained, the gate leaf 4 is conveyed to the locking beam 65 at the top of the water-taking gate groove 2 to be locked through the gate machine 9 arranged at the top of the gate, then the internode connecting plate 7 is connected into a whole through the pin shaft, the lower stoplog water-taking gate cable 96 and the lower stoplog water-taking gate signal wire 97 are moved into the upstream side cable limiting sliding cylinder 91 and are sealed by the cable limiting sliding groove baffle plate 47, then the gate leaf 4 is lowered layer by layer, and the lower stoplog water-taking gate cable 96 and the lower stoplog water-taking gate signal wire 97 are moved into the upstream side cable limiting sliding cylinder 91 to complete the assembly of the lower stoplog water-taking gate 90 and then fall to the gate sill 69. After the upper stoplog water-taking gate 89 is overhauled and maintained, the gate leaf 4 is transported to the locking beam 65 at the top of the water-taking gate groove 2 to be locked through the gate machine 9 arranged at the gate top, and then the gate leaf is connected into a whole through the pin shaft by adopting the internode connecting plate 7, and the upper laminated beam water taking gate cable 93 and the upper laminated beam water taking gate signal line 94 are moved into the downstream side cable limiting sliding cylinder 92 and the lower laminated beam water taking gate cable 96 and the lower laminated beam water taking gate signal line 97 are moved into the upstream side cable limiting sliding cylinder 91 and are sealed by the cable limiting sliding groove baffle plate 47, then the gate leaf 4 is lowered layer by layer and the upper superposed beam water taking gate cable 93 and the upper superposed beam water taking gate signal wire 94 are moved into the downstream side cable limiting sliding cylinder 92, and the lower superposed beam water taking gate cable 96 and the lower superposed beam water taking gate signal wire 97 are moved into the upstream side cable limiting sliding cylinder 91 until the upper superposed beam water taking gate 89 is assembled and then fall to the top of the lower superposed beam water taking gate 90. The vertical arrangement P-head water seal device 107 arranged upstream of the movable flap in the embodiments 1, 2 and 4 of the present disclosure will be further described in detail with reference to FIG. 52. The vertically arranged P-head water seal device 107 consists of a P-head water seal 109, a rubber pad 110 and a water seal pressing plate 102; the movable gate flap 5 is provided with a water seal limiting support plate 108 at the rear part of a rubber pad 110 of a vertically arranged P-head water seal device 107 of the cross beam 103. FIG. 53 to 55 are schematic diagrams of a water-taking and trash holding technique using a gate blade provided with a gate sheet in embodiments 1 and 4 of the present disclosure. A gate 111 is provided on the upstream side in the flow gate 6; the cross section of the grid 111 is a round-head rectangular bar structure 112 at the upstream and downstream.

Figure 56:
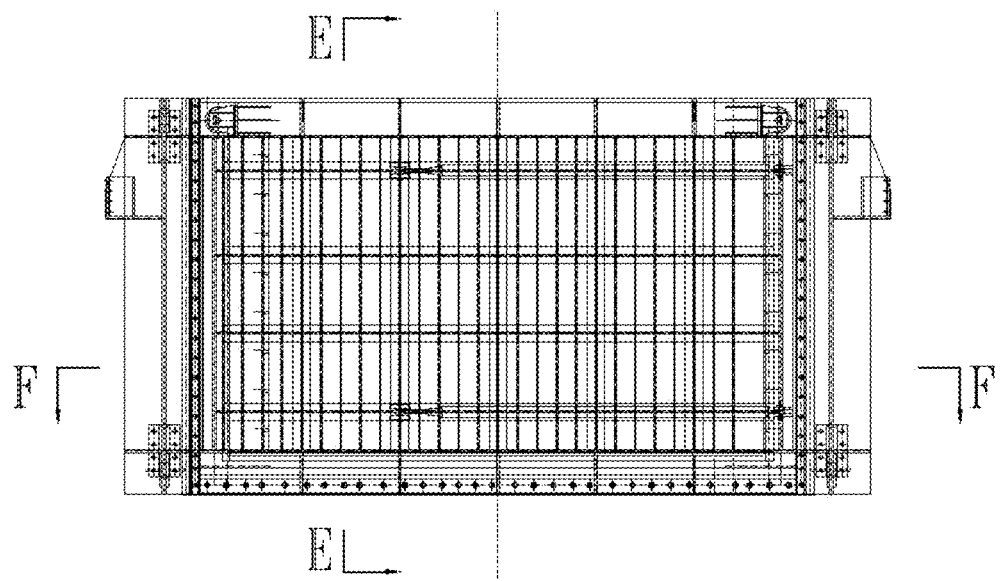
FIG. 56 is a schematic view of a water-taking and dirt blocking technique using a gate blade provided with a gate plate according to embodiment 3 of the present disclosure.
Figure 57:
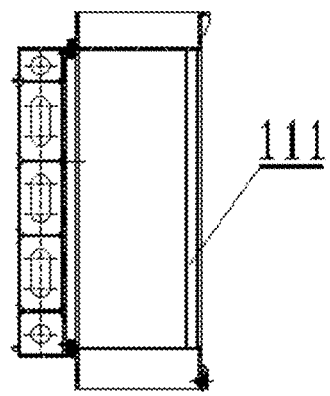
FIG. 57 is a cross-sectional view E-E of FIG. 56.
Figure 58:
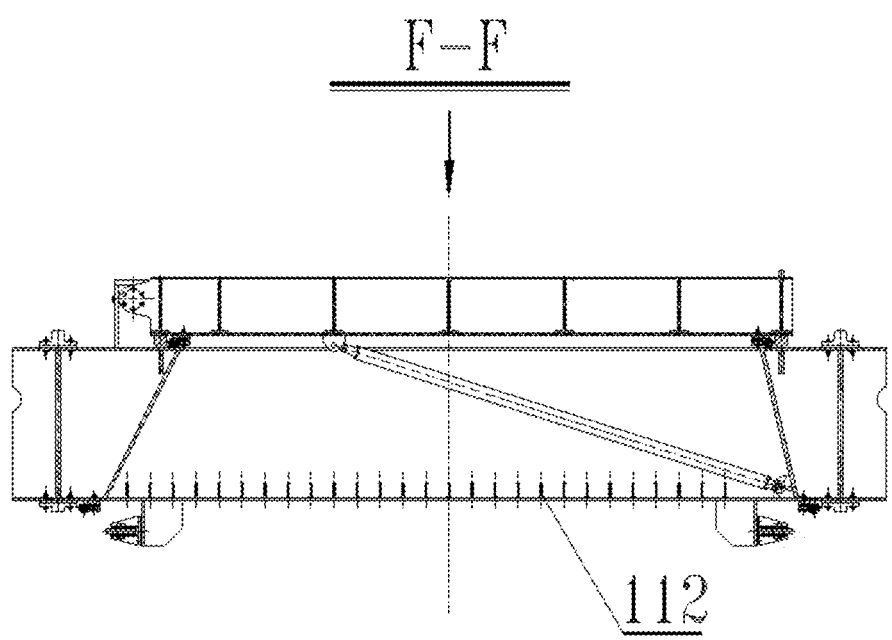
FIG. 58 is a sectional view F-F of FIG. 56.

The water-taking and trash holding technique using the gate blade-installed gate in accordance with embodiment 3 of the present disclosure will be described in further detail with reference to FIGS. 56 to 58. A gate 111 is provided on the downstream side in the flow gate 6; the cross section of the grid 111 is a round-head rectangular bar structure 112 at the upstream and downstream.

The above description is only a preferred embodiment of the present disclosure, and is not intended to limit the scope of the present disclosure, and all modifications and equivalents made by the contents of the present specification and drawings, or directly/indirectly applied to other related technical fields, are included in the scope of the present disclosure.

The invention claimed is:

1. A high-efficient swift stepless layering water intaking gate device, comprising: a relative water intaking gate groove (2) that sets up a relative setting in inlet (1) both sides on a dam body, wherein a plurality of sections of gate leaves (4) are arranged in the water taking gate groove (2) from bottom to top;
   all the gate leaves (4) in the water taking gate groove (2) are divided into a group, and the adjacent gate leaves (4) are connected by adopting an internode connecting plate (7) to form an integral water taking gate;
   alternatively, all the gate leaves (4) in the water taking gate groove (2) are classified into a plurality of groups to form a plurality of sets of stoplog type water taking gates, each set of stoplog type water taking gate is provided with a plurality of sections of gate leaves (4), and adjacent gate leaves (4) are connected into a whole by adopting an internode connecting plate (7); each section of the gate leaves (4) comprises a movable gate flap (5) and a flow gate (6), and the movable gate flap (5) is rotatably arranged on the upstream side of the flow gate (6);
   each section of gate leaves (4) is provided with a movable gate flap opening and closing device (10) for driving the movable gate flap (5) to open or close; and
   a gantry crane (9) or a trolley for lifting or lowering the integral water taking gate or the stoplog type water taking gate is arranged at the top of the dam body.

2. The device as claimed in claim 1, wherein the movable gate valve opening and closing device (10) is an electric push rod or a double-acting oil pump oil cylinder integrated hydraulic machine; and
   one end of the electric push rod or the double-acting oil pump oil cylinder integrated hydraulic machine is hinged on the movable gate flap (5), and the other end is hinged on the flow gate (6).

3. The device as claimed in claim 2, wherein a rotating hinge plate (42) is arranged on the movable gate flap (5), and a fixed hinge plate (41) is arranged on the flow gate (6);
   the rotating hinged plate (42) is rotationally connected with the fixed hinged plate (41) by a pin shaft;
   when the rotating hinge plate (42) is arranged at the lower part of the movable gate flap (5), the fixed hinge plate (41) is arranged at the lower part of the flow gate (6), an upper hanging point (11) of the electric push rod or double-acting oil pump oil cylinder integrated hydraulic machine is connected with a hanging plate (12) at the top of the flow gate (6) through a pin shaft, and a lower hanging point (13) is connected with a lifting lug (14) of the movable gate flap (5) through a pin shaft; and
   when the rotating hinge plate (42) is arranged on the upper part of the movable gate flap (5), the fixed hinge plate

(41) is arranged on the upper part of the flow gate (6), a lower hanging point (13) of the electric push rod or double-acting oil pump oil cylinder integrated hydraulic machine is connected with a hanging plate (12) at the bottom of the flow gate (6) through a pin shaft, and an upper hanging point (11) is connected with a lifting lug (14) of the movable gate flap (5) through a pin shaft.

4. The device as claimed in claim 2, wherein when the movable flap (5) is rotatably mounted at the left end or the right end of the upstream side of the flow gate (6): a rotary hinge plate (42) is arranged at the upper part of the left end or the right end of the movable gate flap (5), a fixed hinge plate (41) is arranged on the flow gate (6) corresponding to the rotary hinge plate (42), and the rotary hinge plate (42) is rotatably connected with the fixed hinge plate (41) by a pin shaft;
- a mushroom shaft head (70) is arranged at the lower part of the left end or the right end of the movable gate flap (5), a bottom pivot (73) is arranged on the flow gate (6) corresponding to the position of the mushroom shaft head (70), and the bottom pivot (73) is rotatably connected with the mushroom shaft head (70); and
- a front hanging point (71) of the electric push rod or double-acting oil pump oil cylinder integrated hydraulic machine is connected with a lifting lug (14) of the movable gate flap (5) through a pin shaft, and a rear hanging point (72) is connected with a lifting plate (12) on the side of the flow gate (6) through a pin shaft.

5. The device as claimed in claim 1, wherein the flow gate (6) is formed by welding an upper cross beam (22), a lower cross beam (23) and box-shaped side columns (24) on the left side and the right side, and a steel structure flow runner hole (25) with a closed flow surface is formed in the flow gate (6);
- a supporting vertical beam (40) is arranged in the box-shaped side columns (24); and
- the position of the supporting vertical beam (40) corresponds to the position of a supporting bar (21) on a movable gate plate (18).

6. The device as claimed in claim 5, wherein and the overflow upstream surface and the overflow outlet surface of the upper cross beam (22), the lower cross beam (23) and the box-type side columns (24) on the left side and the right side are respectively chamfered (32).

7. The device as claimed in claim 5, wherein the box-type side columns (24) are groove-type structural beams or chute-type structural beams formed by welding an upstream side vertical flange plate (36), an outer side web plate (37), an inner side web plate (38) and a downstream side vertical flange plate (39); and
- when the box-type side columns (24) is a chute-type structural beam, the inner web (38) is inclined so that the cross-sectional area of the steel structure flow runner hole (25) gradually increases from the upstream side to the downstream side.

8. The device as claimed in claim 7, wherein a manhole (51) is arranged in the middle of an outer side web plate (37) of the box-type side columns (24), connecting holes (52) are respectively formed in two ends of the outer side web plate, and the internode connecting plate (7) is installed by penetrating through the connecting holes (52) through bolts or pin shafts; and
- the outer side web (37) is also provided with an installation operation hole (53).

9. The device as claimed in claim 1, wherein side water seal devices (29) are respectively arranged on the surface of the downstream side of the flow gate (6) near the two ends;
- the side water seal device (29) is matched with the downstream side rail surface of the water taking gate groove (2) to seal and stop water;
- a bottom water seal device (30) is arranged on the lower part of the surface of the downstream side of the flow gate (6);
- a bottom water seal supporting seat plate (31) is arranged on the upper part of the surface of the downstream side of the flow gate (6); the bottom water seal supporting seat plates (31) of the upper and lower adjacent flow gates (6) are matched with the bottom water seal device (30) to seal and stop water.

10. The device as claimed in claim 1, wherein reverse supports (26) are respectively arranged on the surface of the upstream side of the flow gate (6) near the two ends;
- a positive support (27) and a lateral support (28) are respectively arranged on the surface of the downstream side of the flow gate (6) near the positions of two ends;
- the reverse support (26) and the positive support (27) are matched with the upstream and downstream rail surfaces of the water taking gate groove (2) for supporting and limiting;
- the lateral support (28) is matched with a lateral wall track surface of the water inlet (1) for limiting, and the lateral support (28) is of a roller structure.

11. The device as claimed in claim 1, wherein a hydraulic grabbing beam (54) is arranged on the gantry crane (9) or the trolley; and
- a lifting lug plate (55) and a positioning device (56) which are matched with the hydraulic grabbing beam (54) are arranged at the top of the flow gate (6) of the gate leaves (4).

12. The device as claimed in claim 1, wherein the water taking gate groove is a locking beam (65) is arranged at the position of a top notch of the water taking gate groove (2), and the locking beam (65) is of a bridge-shaped structure.

13. The device as claimed in claim 1, wherein a communicating hole (100) is arranged on a vertical beam (99) of the movable gate flap (5).

14. The device as claimed in claim 1, wherein the flow gate (6) is internally provided with a grid (111), and the cross section of the grid (111) is of an upstream and downstream round-head rectangular strip structure or an upstream and downstream streamline-head rectangular strip structure.

\* \* \* \* \*